(12) United States Patent
Gonguet et al.

(10) Patent No.: US 11,212,186 B2
(45) Date of Patent: Dec. 28, 2021

(54) MEASURING THE IMPACT OF NETWORK DEPLOYMENTS

(71) Applicant: Facebook, Inc., Menlo Park, CA (US)

(72) Inventors: Vincent Gonguet, San Francisco, CA (US); Martinus Arnold de Jongh, Santa Clara, CA (US); Emre Tepedelenlioglu, La Honda, CA (US); Won Hee Park, Palo Alto, CA (US); Austin Chang, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 190 days.

(21) Appl. No.: 16/352,593

(22) Filed: Mar. 13, 2019

(65) Prior Publication Data
US 2020/0296006 A1  Sep. 17, 2020

(51) Int. Cl.
*H04L 12/24* (2006.01)
(52) U.S. Cl.
CPC .......... *H04L 41/142* (2013.01); *H04L 41/14* (2013.01); *H04L 41/16* (2013.01); *H04L 41/22* (2013.01); *H04L 41/5009* (2013.01)
(58) Field of Classification Search
CPC ............ H04L 41/142; H04L 43/0876; H04L 41/5041; H04L 41/14; H04L 41/5009; H04L 41/16; H04L 41/22
See application file for complete search history.

(56) References Cited

U.S. PATENT DOCUMENTS

| 10,200,877 | B1 | 2/2019 | Skidmore | |
|---|---|---|---|---|
| 2006/0046735 | A1* | 3/2006 | Gross | H04W 24/00 455/452.2 |
| 2012/0254710 | A1* | 10/2012 | Flanagan | G06Q 10/0631 715/202 |
| 2014/0075336 | A1* | 3/2014 | Curtis | G06F 3/0481 715/753 |
| 2015/0230206 | A1* | 8/2015 | Tabet | H04W 72/02 370/329 |

(Continued)

OTHER PUBLICATIONS

Bender235, Synthetic Control method, Jan. 2018, Wikipedia, p. 1-2 (Year: 2018).*

(Continued)

*Primary Examiner* — Tonia L Dollinger
*Assistant Examiner* — Joseph M Cousins
(74) *Attorney, Agent, or Firm* — Baker Botts L.L.P.

(57) ABSTRACT

In one embodiment, a computing system may determine network metrics for geographic regions connected by a communication network. The geographic regions may include a geographic region of interest impacted by a network deployment. The system may identify candidate control regions by clustering geographic regions of into a first group based on metric feature of network metric shared by the geographic regions. The system may select control regions by identifying a second group of geographic regions from the first group of geographic regions based on a comparison between the region of interest and each of the first group of geographic regions. The system may compare a first network metric of the geographic region of interest to first a metric baseline determined based on the one or more control regions. The system may determine whether the first network metric has a change greater than a threshold after the network deployment.

20 Claims, 26 Drawing Sheets

(56) References Cited

U.S. PATENT DOCUMENTS

| | | | | |
|---|---|---|---|---|
| 2015/0356099 | A1* | 12/2015 | Targonski | G06Q 50/16 |
| | | | | 707/724 |
| 2017/0323327 | A1* | 11/2017 | Pachisia | G06Q 30/0244 |
| 2018/0206135 | A1 | 7/2018 | Chow | |
| 2018/0206136 | A1* | 7/2018 | Chow | H04W 24/08 |
| 2018/0248904 | A1* | 8/2018 | Villella | G06F 15/76 |
| 2019/0199589 | A1* | 6/2019 | Le | H04L 41/0816 |
| 2020/0067952 | A1* | 2/2020 | Deaguero | G06F 21/552 |
| 2020/0250600 | A1* | 8/2020 | Gupta | G06N 7/005 |
| 2020/0394540 | A1* | 12/2020 | Ochiai | G06N 20/00 |

OTHER PUBLICATIONS

International Search Report and Written Opinion for International Application No. PCT/ US2020/021020, dated May 29, 2020.

\* cited by examiner

FIG. 9A

| Deployments | | | | | | |
|---|---|---|---|---|---|---|
| ☐ | Deployment | Program | Project | Country | Carrier | Methodology | Dates |
| ☐ | ⑧ Barra de Potosia, Mexico | Network Insights | XL Cell Upgrades | Mexico | Carrier A | Greenfield Cellular | 5/16/2018-8/20/2018 |
| ☐ | ③ Aquascalientes, Mexico | Network Insights | XL Cell Upgrades | Mexico | Carrier A | Greenfield Cellular | 5/16/2018-8/20/2018 |
| ☐ | ⑨ Sayulita, Mexico | Network Insights | XL Cell Upgrades | Mexico | Carrier A | Greenfield Cellular | 5/16/2018-8/20/2018 |
| ☐ | ② Huasca de Ocampo, Mexico | Network Insights | XL Cell Upgrades | Mexico | Carrier A | Greenfield Cellular | 5/16/2018-8/20/2018 |
| ☐ | ⑫ Yelapa, Mexico | | | | Carrier A | Greenfield Cellular | 5/16/2018-8/20/2018 |
| ☐ | ③ Tepoztlan, Mexico | Edit Project — 911 915 × | | | Carrier A | Greenfield Cellular | 5/16/2018-8/20/2018 |
| ☐ | ① Malinalco, Mexico | 912 913 914 | | | Carrier A | Greenfield Cellular | 5/16/2018-8/20/2018 |
| ☐ | ② Mazunte, Mexico | Project Name 1  Carrier A  Mexico  Edit¦Delete | | | Carrier A | Greenfield Cellular | 5/16/2018-8/20/2018 |
| ☐ | ⑨ Todos Santos, Mexico | Project Name 2  Carrier B  Mexico  Edit¦Delete | | | Carrier A | Greenfield Cellular | 5/16/2018-8/20/2018 |
| ☑ | ㉜ Tlacotalpan, Mexico | Project Name 3  Carrier C  Mexico  Edit¦Delete | | | Carrier A | Greenfield Cellular | 5/16/2018-8/20/2018 |
| ☐ | ③ San Sebastian Bernal, Mexico | Project Name 4  Carrier C  Mexico  Edit¦Delete | | | Carrier A | Greenfield Cellular | 5/16/2018-8/20/2018 |
| ☐ | ⑦ Sonoma, Mexico | Project Name 5  Carrier E  Mexico  Edit¦Delete | | | Carrier A | Greenfield Cellular | 5/16/2018-8/20/2018 |
| | | [New Project] — 916 917 [Done] | | | | | |

*FIG. 9B*

Search Deployments — 922

- Projects — 923
  - Program
    - ☐ Network Insights
    - ☐ Terragraph
    - ☐ Wi-Fi — 924
  - Project
    - ☐ Africa Wi-Fi Launches
    - ☐ Brazil Cell Upgrades
    - ☐ Colombia Rural Access
    - ☐ Delta Urban
    - ☐ YZ Fiber Backhaul
    - ☐ XL Cell Upgrades
- Location — 925
  - Search Countries
- Carrier — 926
  - ☐ Carrier A
  - ☐ Carrier B
  - ☐ Carrier C
  - ☐ Carrier D
- Carrier ID — 927
  - Search Carrier ID

[Upload Deployments] [Edit Projects] — 928 929

◉ Map View  ☰ List View — 921

Share · Help — 938  Nov 26, 2017 - Dec 9, 2017 ▼

Deployments — 930

| Deployment (931) | Program (932) | Project (933) | Country (934) | Carrier (935) | Methodology (936) | Dates (937) |
|---|---|---|---|---|---|---|
| ⑧ Barra de Potosia, Mexico | Network Insights | XL Cell Upgrades | Mexico | Carrier A | Greenfield Cellular | 5/16/2018-8/20/2018 |
| ③ Aquascalientes, Mexico | Network Insights | XL Cell Upgrades | Mexico | Carrier A | Greenfield Cellular | 5/16/2018-8/20/2018 |
| ⑨ Sayulita, Mexico | Network Insights | XL Cell Upgrades | Mexico | Carrier A | Greenfield Cellular | 5/16/2018-8/20/2018 |
| ② Huasca de Ocampo, Mexico | Network Insights | XL Cell Upgrades | Mexico | Carrier A | Greenfield Cellular | 5/16/2018-8/20/2018 |
| ⑫ Yelapa, Mexico | Network Insights | XL Cell Upgrades | Mexico | Carrier A | Greenfield Cellular | 5/16/2018-8/20/2018 |
| ③ Tepoztlan, Mexico | Network Insights | XL Cell Upgrades | Mexico | Carrier A | Greenfield Cellular | 5/16/2018-8/20/2018 |
| ① Malinalco, Mexico | Network Insights | XL Cell Upgrades | Mexico | Carrier A | Greenfield Cellular | 5/16/2018-8/20/2018 |
| ② Mazunte, Mexico | Network Insights | XL Cell Upgrades | Mexico | Carrier A | Greenfield Cellular | 5/16/2018-8/20/2018 |
| ⑨ Todos Santos, Mexico | Network Insights | XL Cell Upgrades | Mexico | Carrier A | Greenfield Cellular | 5/16/2018-8/20/2018 |
| ㉜ Tlacotalpan, Mexico | Network Insights | XL Cell Upgrades | Mexico | Carrier A | Greenfield Cellular | 5/16/2018-8/20/2018 |
| ③ San Sebastion Bernal, Mexico | Network Insights | XL Cell Upgrades | Mexico | Carrier A | Greenfield Cellular | 5/16/2018-8/20/2018 |
| ⑦ Sonoma, Mexico | Network Insights | XL Cell Upgrades | Mexico | Carrier A | Greenfield Cellular | 5/16/2018-8/20/2018 |

940

[View Results] — 939

MEASURING THE IMPACT OF NETWORK DEPLOYMENTS

TECHNICAL FIELD

This disclosure generally relates to communication networks, and in particular, to measuring the impact of network deployments.

BACKGROUND

Communication networks, such as fiber-optic networks, cellular networks, and broadband wireless networks, provide data communication channels for computing systems (e.g., a computer, a tablet, a smartphone) to communicate data and information, such as, text, images, videos, website content, etc. A geographic area covered by a communication network may be divided into a number of sub-areas (e.g., tiles, cells in cellular networks, regions such as a county, an area of a collection of cities, towns, village, etc.). Each sub-area may generate certain amount of network traffic and the communication network may provide connection services to any number sub-areas covered by the communication network. Users may access the communication network (e.g., using a computing device) for downloading and uploading data. The communication network may have a bandwidth to allow the users to use services supported by the communication network.

SUMMARY OF PARTICULAR EMBODIMENTS

Particular embodiments described here relate to a method of measuring impacts of network connectivity deployments based on incremental metrics and synthetic controls method. The system may firstly collect, for each deployment and from supporting infrastructures (e.g., SN servers, applications, carrier infrastructures), network performance data and deployment information related to impacted regions (e.g., countries, cities, states/provinces, a location with impact radius, tiles, zip code areas, kilometer-level regions), impacted users, impacted carriers (e.g., carrier IDs), deployment type (e.g., adding Wi-Fi access point, improving backhaul, 4G upgrading), time window (e.g., deployment launch date, duration), etc. The collected network performance data may be associated with a first time period (e.g., 60 days, 6 months) before the deployment and a second time period (e.g., 60 days, 6 months) after the deployment. Then, the system may pre-process the collected data and cluster candidate control regions into groups or categories to narrow down the scope for identifying qualified control regions. Each group may contain candidate control regions that have at least one similarity based on one or more network metric features (e.g., trends, slopes, ranges, errors, changes, confidence levels etc.). The network metric features may be determined based on the network performance data associated with the first time period before the deployment. Then, the system may determine a group of qualified control regions based on network metric features associated with these regions and one or more qualification criteria (e.g., trend criteria, slope ranges, value ranges, similarity thresholds, confidence levels, error levels, etc.) for these network metrics or network metric features. The system may determine one or more network metric baselines based on the network metrics of the qualified control regions based on the pre-deployment network performance data. After that, the system may determine the impacts of each deployment by comparing the post-deployment network metrics of the region of interest to the corresponding baselines. The system may determine whether the deployment impacts are significant based on the incremental network metrics and corresponding significance criteria (e.g., significance thresholds). The system may visualize and display the measurement results of each deployment to the user on an interactive user interface.

In particular embodiments, the system may use multiple methodologies (e.g., causal inference methods including synthetic controls, holdout-based experiments, growth accounting method, etc.) for measuring the deployment impacts. Each methodology may be based on one or more network metrics pre-selected for that methodology, for example, network speed, network latency, number of connected people, time spent on network, sample volume, incremental number of internet users (e.g., incremental monthly active people (MAP)), incremental number of internet users experiencing faster network speed (e.g., incremental monthly active people (MAP) experiencing faster network speed), signal strength, growth accounting metrics (e.g., churned users, new users, resurrected users), etc. In particular embodiments, the system may determine that, for a particular deployment, qualified control regions cannot be identified because there are no regions meeting the qualification criteria. The system may indicate that the deployment impact cannot be effectively measured because lack of qualified control regions and any automatic inference based on the assumed existence of qualified control regions may be not reliable. By identifying the failure of synthetic method when it happens, the system may avoid unreliable or mistaken inference from the automatic measurement process. The system may dramatically improve the decision-making process for prioritizing connectivity deployments based on more accurate measurement results.

In particular embodiments, the system may measure the impacts of network connectivity deployments based on network metrics and methodologies as specified by a user through an interactive user interface (UI). The system may receive, via the interactive UI, user inputs containing information about the network deployments (e.g., a deployment project, a deployment date, a deployment type, a project creator, a deployment location, a carrier ID, an expected impact range, impacted tiles, a deployment priority) and information about network metrics (e.g., network speed, latency, time spent, incremental number of internet users, incremental number of internet users experiencing faster network speed, significance thresholds, filtering criteria) for measuring network performance. Then, the system may create a network measurement project for measuring the network performance. The system may collect or access network performance data for a time window (e.g., 120 days) around the deployment (e.g., 60 days before the deployment and 60 days after the deployment). After that, the system may determine network metrics as specified by the user based on the collected or accessed network performance data. The system may compare the network metrics after the deployment to corresponding baselines to determine incremental network metric (e.g., incremental number of internet users or incremental number of internet users experiencing faster network speed). The system may determine whether the impact of the deployment is significant based on the incremental number of internet users or incremental number of internet users experiencing faster network speed and one or more significance criteria (e.g., significance thresholds). At last, the system may visualize and display the measured impacts of the deployment on the interactive UI to the user. The displayed measurement results may be customized or updated by the user based on the user inputs received through the interactive UI.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 9A illustrates an example interactive user interface (UI) for receiving inputs from users for creating measurement project.

FIG. 9B illustrates an example interactive user interface (UI) for receive inputs from users for editing measurement projects.

FIG. 9C illustrates an example interactive user interface (UI) for displaying measurement projects in a list view and allowing users to configure the measurement projects in control panels.

FIG. 9F illustrates an example interactive user interface (UI) for users to upload deployment data file.

DESCRIPTION OF EXAMPLE EMBODIMENTS

Overview

Problems

Figure 1:
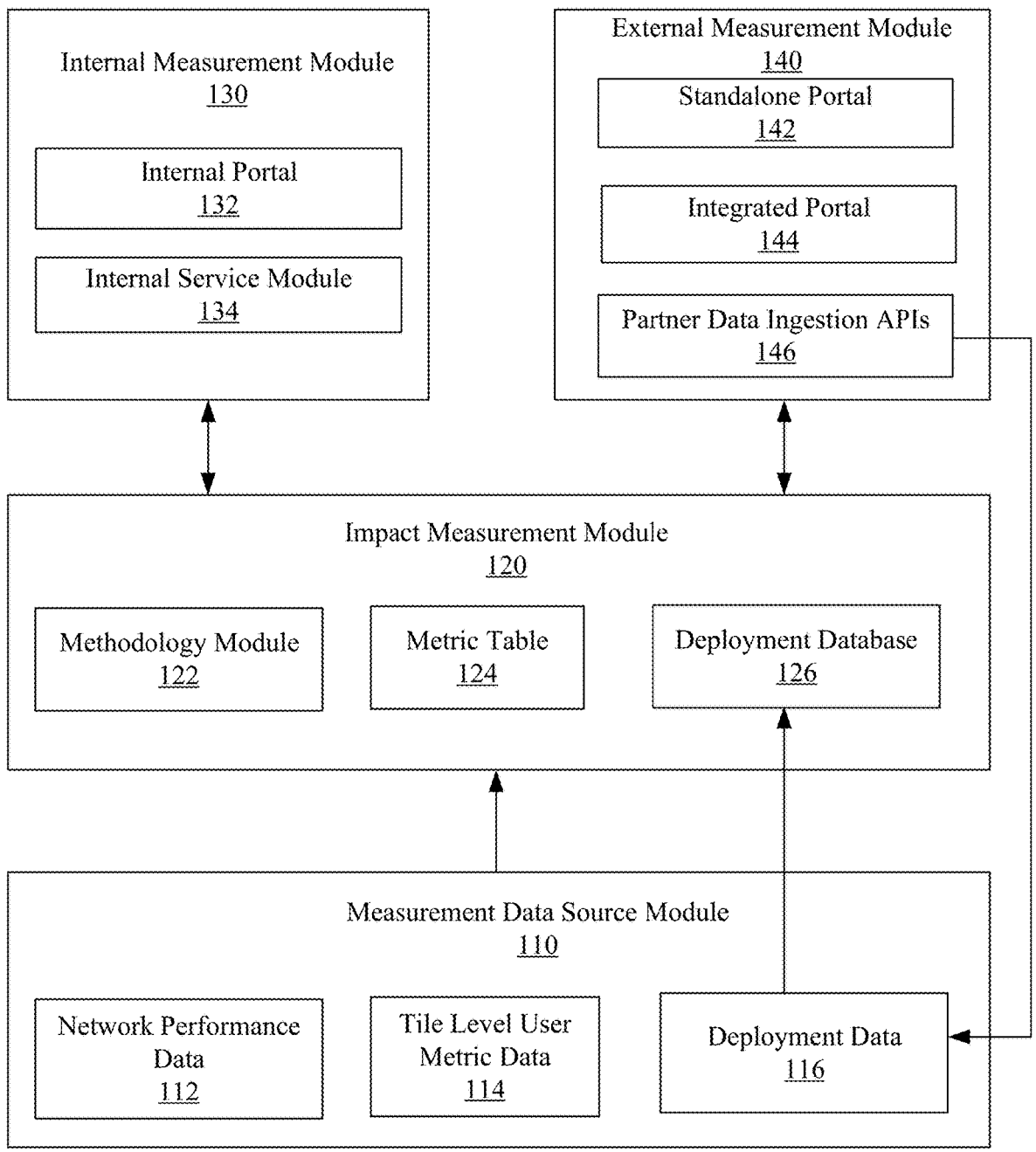
FIG. 1 illustrates an example architecture of the deployment impact measurement system.

Traditional systems and methods for deploying network connectivity deployments for optimizing the communication networks have many shortcomings and may result in non-optimal network performance. For example, traditional systems and method for measuring deployment impacts may assume the existence of the qualified control regions which may be not true in certain situations. When there are no qualified control regions for the measurement, traditional systems and method may generate unreliable or even mistaken inference from the measurement results and deploy wrong deployments for optimizing the communication network, which may consequently result in non-optimal network performance (e.g., reduced network speed, suppressed active user number, longer network latency, etc.). Furthermore, even when the qualified control regions do exist, traditional systems and methods cannot effectively identify them when the number of candidate control regions is large (e.g., hundreds or thousands of cities or areas of a country). The non-optimal control regions may lead to inaccurate measurement results on deployment impacts and lead to non-optimal or even mistaken deployments on the network which would result in non-optimal network performance. In addition, traditional systems and methods measures only relative larger regions (e.g., state/province level or city level). When the impact region is relatively small (e.g., zip code areas, kilometer-level regions), these small regions contain relatively small number of samples (e.g., network users). The network metric relying on averaging a large number of samples may be unstable or/and unreliable because only limited number of samples are available in these regions and traditional systems and methods may lead to inaccurate impact measurement and non-optimal network deployments.

Solution

Particular embodiments of the system address the shortcomings of the traditional systems and methods and provide technical solutions to these technical problems. For example, particular embodiments of the system may identify the situations when qualified control regions do not exist. Therefore, the system can avoid unreliable or mistaken inference from the measurements those are based on the assumed existence of the qualified control regions and avoid non-optimal network deployments. As another example, particular embodiments of the system may use a clustering process to group a large number of candidate control regions (e.g., with similar features) into a number of categories for narrowing down the control region scope and identify the qualified control regions with high accuracy and precision. As another example, particular embodiments of the system may use a weighted combination of many control region to determine an accurate and precise baseline for measuring deployment impacts. The system improves the accuracy and precision of the measurement on the deployment impact even when the impacted regions have relatively small number of samples.

Benefits/Technical Effects

Particular embodiments of the system address the limitations and shortcoming of the traditional systems and methods for deploying network connectivity deployments to optimize the communication network. Particular embodiments of the system avoid unreliable or mistaken inference from the measurements that are based on the assumed existence of the control regions and improve network performance by improving the effectiveness of the network deployments. Particular embodiments of the system identify qualified control regions with better quality and accuracy from a large number of candidate control regions. Particular embodiments of the system improve the accuracy and precision for measuring network deployment impacts. Particular embodiments of the system enable optimal network deployments and improve network performance (e.g., higher network speed, lower network latency, more connected users, etc.)

System Architecture

FIG. 1 illustrates an example architecture of the deployment impact measurement system 100. In particular embodiments, the system 100 may include a measurement data source module 110, an impact measurement module 120, an internal measurement module 130, an external measurement module 140, etc. The measurement data source module 110 may include a number of data sources providing data (e.g., network performance data 112, tile level user metric data 114, deployment data 116, etc.) for the impact measurement module 120. The measurement data source module 110 may include a data collection program for collecting all related data from supporting infrastructures (e.g., SN servers, applications, carrier infrastructures). The network performance data may be collected from a network insight system and tile level user metric data may be generated by a geographic prediction algorithm. The impact measurement module 120 may include a methodology module 122, a metric table 124, a deployment database 126, etc. The methodology module 122 may include implementations of a number of different methodologies (e.g., synthetic controls method, hold-out experiments, growth accounting method, etc.) for measuring the deployment impacts. The deployment database 126 may store the data related to the deployments (e.g., historical deployments, future deployments) taken by any entities. The deployment database 126 may receive the deployment data 116 from the measurement data source module 110. The impact measurement module 120 may receive and process data (e.g., data network performance data 112, tile level user metric data 114, deployment data 116, etc.) from the measurement data source module 110 and generate the deployment impact measurement results. The internal measurement module 120 for internal customers may include an internal portal 132 (e.g., dashboards), an internal service module 134, etc. The external measurement module 140 for external partners (e.g., mobile network operators, internet service providers, original equipment manufacturers, etc.) may include a standalone portal 142, a portal integrated into existing portals 144, partner data ingestion APIs 146, etc. The impact measurement module 120 may receive from and send data to the internal measurement module 130 and the external measurement module 140. The partner data ingestion APIs 146 may collect the partner deployment data and send the collected data to the deployment module 116. The internal measurement module 130 and external measurement module 140 may include a number of interactive user interfaces for the customers (e.g., internal customers and external customers) to interact (e.g., inputting queries and viewing results) with the system 100.

Incremental Number of Internet Users

Synthetic Controls Method

In particular embodiments, the system may use a synthetic controls method to measure the impacts of network connectivity deployments taken on one or more communication networks. The synthetic controls method may be a statistical method used to evaluate the effect of a network deployment or intervention in comparative measurement. The synthetic method may involve the identification of one or more control regions to which the region of interest impacted by the deployment or intervention is compared. The control regions may be used to determine a baseline (e.g., using a weighted combination of two or more controls regions) which may indicate what would have happened to the region of interest if it had not received the deployment or intervention. The impact of the deployment or intervention may be measured by the comparing one or more network performance metrics after the deployment or intervention to the determined baseline.

Incremental Metrics

In particular embodiments, the system may determine one or more incremental metrics for the communication network to quantify the deployment impacts. In particular embodiments, the incremental metrics may include, for example, but are not limited to, incremental number of internet users (e.g., incremental monthly active people (MAP)), incremental number of internet users experiencing faster network speed or less network latency (e.g., incremental monthly active people (MAP) experiencing faster network speed), time spent on network, signal strength, growth accounting metrics (e.g., number of churned users, user churning rates, number of new users, number of resurrected users), number of connected people, network traffic volume, number of samples, sample volume, etc. In particular embodiments, the system may measure the impact of a network deployment taken on a communication network based on one or more key performance indicators (KPIs) of the network ecosystem (e.g., internet adoption, network speed, revenue, network usage, etc.). In particular embodiments, the system may determine a complex impact metric based on a weighted combination of multiple network metrics. The complex impact metric may indicate the overall level of impact of a deployment considering multiple network metrics and corresponding weighting factors. In particular embodiments, the system may calculate the incremental metrics by comparing the network metrics after the deployment to the determined baseline indicating what would have happened if the impacted regions had not received the deployment.

Causal Inference Methods Including Synthetic Controls

In particular embodiments, the system may measure the deployment impacts (e.g., determining the positive and statistically significant impact of the deployment) by comparing one or more network metrics of the region of interest to a baseline indicating what would have happened to the region of interest if it had not received the deployment. In particular embodiments, the system may use multiple methodologies to determine the baseline for measuring the deployment impacts. In particular embodiments, the system may use quasi-experimental statistical methods to find credible control regions for determining the baseline. For example, the system may use a causal inference method including synthetic controls to determine the control regions. The causal inference method may include a model for identifying control regions and associated properties (e.g., locations, areas, sizes) for measuring incremental changes in the region of interest. The causal inference method may identify the control regions by matching the network metric features (e.g., trends, slopes, ranges, changes, error levels, confidence levels) of the candidate control regions and the region of interest based on the pre-deployment network performance data. For example, the system may determine one or more network metric features associated with candidate control regions based on the pre-deployment network performance data. The system may compare the identified network metric features of the candidate control regions to the network metric features of the region of interest. The system may identify qualified control regions when the network metric features (e.g., trends, slopes, ranges, error levels, confidence levels) of the candidate control regions and the region of interest meet one or more qualification criteria (e.g., similarity thresholds). The system may assume the network metrics in the regions impacted by the deployment would have been approximated by the control regions or a weighted combination of the control regions if the deployment is not deployed.

Step 1: Data Collection

In particular embodiments, the system may firstly collect data related to the impacted users, impacted regions (e.g., impacted locations, impacted area size, impacted radius), impacted carrier (e.g., carrier IDs), impact time window (e.g., launch date, impact duration), impact type (e.g., new Wi-Fi, improved backhaul, higher network speed, less network latency, upgraded 4G/5G networks, improved network coverage, etc.), deployment or intervention information (e.g., deployment date, deployment type, deployment duration, deployment location latitude, deployment location longitude, impact radius), etc. The network data may be collected from one or more supporting infrastructures (e.g., SN servers, applications, carriers, etc.) of one or more communication networks.

In particular embodiments, the system may measure the deployment impact for a predetermined time window around the network deployment date. For example, the system may measure the deployment impacts within a 120-day time window around deployment event, for example, 60 days before the deployment and 60 days after the deployment. The system may access or collect network data associated with a 60-day time period before the deployment and a 60-day time period after the deployment. As another example, the system may measure the impacts within a 6-month time window around the deployment event. The system may access or collect network data associated with a 3-month period before the deployment and a 3-month time period after the deployment. As another example, the system may measure the impacts within a 12-month time window around the deployment event. The system may access or collect network data associated with a 6-month time period before the deployment and a 6-month time period after the deployment.

In particular embodiments, the system may calculate incremental number of internet users based on data related to users who use internet (e.g., social networks) most frequently near deployment location as determined using a geographic prediction algorithm. In particular embodiments, the system may calculate the incremental number of internet users based on one or more other types of data, for example, application data (e.g., social network applications, third-party applications, network operators' applications, carriers' applications), network traffic data (e.g., cell tower data), server data, carrier data, data of service providers, data of application developers, third-party data, etc. In particular embodiments, the system may calculate incremental number of internet users for each deployment by calculating users predicted to live in the impacted area using a geographic prediction algorithm. The geographic prediction algorithm may not be consistent over time, especially when users split their time between two different geographical areas. To solve the consistency problem, the system may use the most frequently observed geographic tile during a predetermined period of time (e.g., the last 14 days) for each user. In particular embodiments, the geographic prediction algorithm may use different time windows to smooth user-level tile predictions and further improve prediction consistency. The system may use the most frequent internet usage tiles (e.g., social network usage tiles) to capture a large percentage of internet users with location service enabled (e.g., 70% of social network usage of location service enabled users). The system may use a custom pipeline that matches users to the most frequent internet usage tiles. The system may aggregate engagement metrics with location service enabled users to get another signal on the impact of deployments on a subpopulation for whom the system may have good location signals. The system may improve the accuracy of the geographic prediction result. In particular embodiments, the system may smooth the geographic prediction data at the user level to provide more stable user-to-tile mapping.

Step 2: Regions Clustering and Narrowing Down

In particular embodiments, there may be a larger number of regions, for example, states/provinces, cities, towns across of a country, which could be candidate control regions for measuring the deployment impact on a particular region of interest (e.g., a city). Because of the sheer number of candidate control regions (e.g., hundreds or thousands of cities or areas across the country), it could be difficult to find qualified control regions to approximate the region of interest. In particular embodiments, the system may pre-process the collected data and cluster candidate control regions into groups to narrow down the scope for identifying qualified control regions. Each group may contain candidate control regions having at least one similarity. The similarity may be determined based on one or more network metrics (e.g., incremental number of internet users, incremental number of internet users experiencing faster network speed, time spent on network, network traffic, signal strength, number of samples, etc.) or/and one or more network metric features (e.g., trends, slopes, changes, ranges, error levels, confidence levels). The similarity required by the regions for being clustered into the same category may include one network metric feature or a combination of multiple network metric features. The network metric feature(s) may be based on one network metric or a combination of multiple network metrics. In particular embodiments, the system may cluster the candidate control regions based on average metric values or/and the slopes of metrics. In particular embodiments, the system may use dimension reduction technique to determine the historical trends of one or more network metrics and cluster the candidate control region based on the determined trends.

As an example and not by way of limitation, the system may determine the monthly active people (MAP) for a number of regions which are not impacted by the deployment (e.g., hold-out regions, regions other than the impacted regions) based on the collected data. The system may identify one or more trends (e.g., increasing, decreasing, fluctuating, stable) of the pre-deployment MAP of the regions. Then, the system may cluster the regions into different categories (e.g., increasing regions, decreasing regions, fluctuating regions, regions with stable MAP) based on the identified trends of corresponding regions. The regions clustered into a particular category or group may have the same or similar trends and may be used as the candidate control regions for a region of interest with the same or similar MAP trend. As another example, the system may determine the slope of the MAP curve over a pre-determined time period (e.g., 60 days) for a number of regions before the deployment. Then, the system may cluster the regions into different categories based on the slope ranges (e.g., $-15°\sim-10°$, $-10°\sim-5°$, $-5°\sim-0°$, $0°\sim5°$, $5°\sim10°$, $10°\sim15°$) of the MAP curves of the regions. All the regions clustered into the same category may have MAP curve slope being within the same predetermined range and may be used as the candidate control regions for a region of interest which has MAP curve slope within the same range. It is notable that the MAP is used as an example metric and the network metric is not limited to MAP. Any suitable network metric that can be used for characterizing the network performance may be used as basis for clustering the candidate control region. The network metrics may include, for example, but are not limited to, monthly active people (MAP), monthly active people (MAP) experiencing faster network speed (e.g., faster network download speed, less network latency), time spent on network, signal strength, growth accounting metrics (e.g., churned users, user churning rates, new users, resurrected users), number of connected people, network traffic volume, number of samples, sample volume, etc.

As another example, the system may cluster the regions into different categories based on the network metric values or ranges of these regions. When network speed is used as the network metric, the regions may be clustered into different categories based on the network speed values or ranges in these regions (e.g., Very Poor: <0.5 Mbps; Poor: 0~1 Mbps; Fair: 1~1.5 Mbps; Good: 1.5~5 Mbps; Very good: 5~15 Mbps; Great: >15 Mps, etc.). All the regions in the same category may be used as the candidate control regions for a region of interest having network speed within the same range. As another example, the system may cluster the regions into different categories based on the error levels of a network metric. All the regions in a category may be used as the candidate control region for a region of interest having the same error level for that network metric. As another example, the system may cluster the regions into different categories based on the confidence levels of a network metric. All the regions in a category may be used as the candidate control regions for a region of interest having the same confidence level for that network metric. As another example, the system may cluster the regions into different categories based any combination of two or more network metric features (e.g., trends, slopes, changes, ranges, error levels, confidence levels). For example, the system may cluster all the regions having network speed lower than 0.5 Mbps and the network speed decreasing slope within $(-1°, 0°)$ as a poor and slowly decreasing network speed category.

Step 3: Identify Control Regions

In particular embodiments, the system may cluster the candidate control regions into different categories or groups to narrow down the scope for identifying the qualified control regions with faster speed and higher quality (e.g., more accurate and better approximation of the trends by the control regions). After the candidate control regions have been clustered into corresponding categories or groups, the system may identify qualified control regions based on network metric features associated with these regions and one or more qualification criteria. In particular embodiments, the qualification criteria may include one or more qualification thresholds for one or more network metrics or network metrics features associated with the regions. The qualification thresholds may indicate a degree of similarity or a degree of matching between the pre-deployment network metrics (or network metric features) of the control regions and the region of interest. The system may compare the network metrics or network metric features of the region of the interest to those of the candidate control regions and identify these regions as qualified control regions when the degree of matching meets the qualification criteria defined by the corresponding similarity thresholds.

Figure 2A:
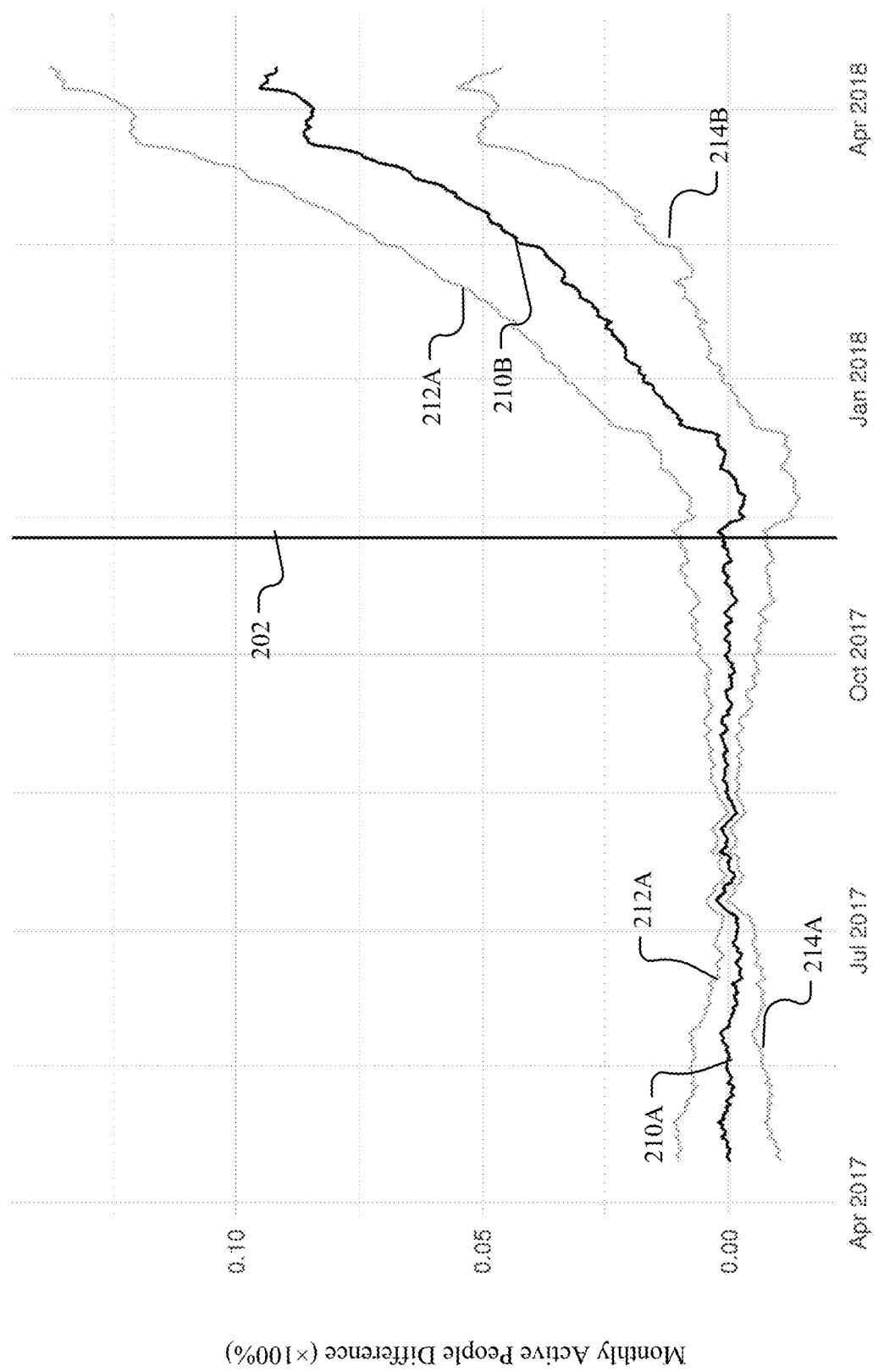
FIG. 2A illustrates an example network metric matching result for identifying qualified control regions using causal inference methods including synthetic controls.

FIG. 2A illustrates an example network metric matching result for identifying qualified control regions using causal inference methods including synthetic controls. As an example and not by way of limitation, the system may measure the deployment impact for a 12-month time window (e.g., with a first 6-month time period before deployment time 202 and a second 6-month time period after the deployment time 202). The system may collect the network performance data over these time periods and calculate the MAP values over these time periods for the candidate control regions and the region of interest. Then, the system may calculate the MAP value difference of the candidate control regions and the region of interest as illustrated by the curve 210A for the pre-deployment time period and as illustrated by the curve 210B for the post-deployment time period. The system may determine a confidence interval (e.g., a top-limit curve 212A-B and a bottom-limit curve 214A-B for 95% confidence interval) for the statistical significance. The curve of the MAP difference 210A-B may be divided by the deployment time 202 into the pre-deployment portion 210A and the post-deployment portion 210B. The system may determine whether a candidate control region is a qualified control region based on the pre-deployment MAP difference (e.g., 210A) and one or more qualification thresholds. For example, the system may use a 0.5% range of fluctuation as the qualification threshold. The may determine the candidate control region associated with the MAP difference curve 210A as a qualified control region because the MAP difference is around 0% which is within the 0.5% range of fluctuation. As another example, the system may use a ±1° slope threshold as the qualification threshold. The may determine the candidate control region associated with the MAP difference curve 210A as a qualified control region because the MAP difference curve has an overall slope within ±1°. In particular embodiments, the system may calculate the MAP difference between the region of interest and a weighted combination of candidate control regions and identify these candidate control regions as qualified control regions when the MAP difference meets the requirements as defined by the corresponding qualification thresholds. The system may determine the weighted combination of control regions which best matches the network MAP trend in the deployment area before deployment.

Step 4: Determine Significant Impact

After the qualified control regions have been identified, the system may determine a baseline based on one or more control regions or a weighted combination of control regions for measuring the deployment impact of the region of interest. The system may assume that the MAP trend in the region of interest after deployment can be approximated by the same weighted combination of control regions if the deployments are not taken. The system may compare the MAP of the impacted regions (e.g., regions of interest) to the MAP trends as approximated by the weighted combination of the control regions to measure the deployment impacts by calculating the MAP difference of the impacted regions and the baseline. As an example and not by way of limitation, the MAP difference curve 210B illustrates the difference between the MAP of an impacted region and the determined baseline. The curve 210B indicate that the MAP difference between the impact region and the baseline increases positively from 0% to 8% with an approximate 45° slope over the 6-month time period after the deployment.

In particular embodiments, the system may determine whether there are significant impacts based on the incremental number of internet users (e.g., MAP) and corresponding significance criteria (e.g., significance thresholds). For example, the system may use 5% positive increase over a 6-month time period as a significance threshold for incremental number of internet users (e.g., MAP) and may determine the deployment impact as illustrated by 210B in FIG. 2A as a significant impact (since it increased 8% positively over the 6-month time period). As another example, the system may use a 30° slope for positive increasing over a 6-month time period as a significance threshold and may determine that the impact as illustrated by 210B in FIG. 2A as a significant impact (since it has a 45° slope for positive increasing over a 6-month time period). In particular embodiments, the system may calculate standard errors of metrics using out-of-sample predictions from synthetic controls method and use a threshold based on statistical confidence to qualify or disqualify a measured impact as a significant impact. For example, when the standard errors on the overall incremental number of internet users is larger than a statistical confidence threshold, the system may determine that the measured impact is not statistically significant.

Application Cases

As another example, the system may use the casual inference methods including synthetic controls to measure the impact of a deployment which adds or upgrades 481 cell towers in a number of deployment regions. The system may use a 120-day time window (e.g., 60 days before deployment and 60 days after deployment) to determine incremental number of internet users (e.g., incremental MAP) of the deployment. The system may use 95% confidence for the significance threshold. For example, the system may determine, for a first group of 34 cell towers (i.e., 7.07% of all towers impacted by the deployment), that the total number of internet users (e.g., total MAP) over the 120-day time window is 567,126 with the incremental number of internet users of 28,035 with 95% confidence interval (25,977, 30,093). Since the lower bound on confidence interval of incremental number of internet users (e.g., incremental MAP) change is above zero, the system may determine that impact in these regions is positive and statistically significant. As another example, the system may determine, for a second group of 13 cell towers (i.e., 2.70% of all towers impacted by the deployment), that the total number of internet users (e.g., total MAP) over the 120-day time window is 260,090 with the incremental number of internet users of −15,321. The change of incremental number of internet users is −5.80% which is below −3%. Therefore, the system may determine that impact in these regions is negative and statistically significant. As another example, the system may determine, for a third group of 114 cell towers (i.e., 23.70% of all towers impacted by the deployment), that the total number of internet users (e.g., total MAP) over the 120-day time window is 8,151,820 with the incremental number of internet users of 12,201. The change of the incremental number of internet users is 0.15% which is within ±3%. Therefore, the system may determine that absolute value of impact is less than 3% in these regions and is not statistically significant. As another example, the system may determine, for a fourth group of 152 cell towers (i.e., 31.60% of all towers impacted by the deployment), that the total number of internet users (e.g., total MAP) over the 120-day time window is 5,835,144 with the incremental number of internet users (e.g., incremental MAP) of 115, 759. The change of the incremental number of internet users is 2.04% which is within ±3%. Therefore, the system may determine that the impact in these regions is not statistically significant but is above 1%. As another example, the system may determine, for a fifth group of 100 cell towers (i.e., 20.79% of all towers impacted by the deployment), that the total number of internet users (e.g., total MAP) over the 120-day time window is 3,092,167 with the incremental number of internet users (e.g., incremental MAP) of −49, 385. The change of the incremental number of internet users is −1.59% which is within ±3%. Therefore, the system may determine that the impact in these regions is not statistically significant and is below −1%. As another example, the system may determine, for a sixth group of 68 cell towers (i.e., 14.14% of all towers impacted by the deployment), that the total number on internet users (e.g., total MAP) over the 120-day time window is 2,932,815 with the incremental number of internet users (e.g., incremental MAP) of 84,245. Although the change of the incremental number of internet users is 3%, the system may determine that the impact in these regions cannot be measured because the system cannot identify credible control regions (e.g., training error highly deviates from t-distribution). The inference automatically generated by the system should not be counted as impact. As another example, the system may determine that the total number of internet users (e.g., total MAP) over these 481 cell towers cannot be determined since the standard errors on the overall incremental number of internet users (e.g., incremental MAP) is above the stand error threshold, and the system may determine that the stand error is too large to claim statistical significance for the overall number of internet users (e.g., MAP) of the 481 cell towers.

Identify Failure of Measurement

Traditional systems and method for measuring deployment impacts may always assume the existence of qualified control regions which may be not true in certain situations. When there are no qualified control regions for the measurement, traditional systems and method may generate unreliable or even mistaken inference from the measurement results and deploy wrong deployments for optimizing the communication network, which may consequently result in non-optimal network performance (e.g., reduced network speed, suppressed active user number, longer network latency, etc.).

In particular embodiments, the system may identify the failures of the synthetic controls method when it happens and avoid unreliable or incorrect inference from impact measurement results by identifying the situations when qualified control regions do not exist. As an example and not by way of limitation, the system may determine that the synthetic controls method fails based on the temporal pattern before deployment which shows that the counterfactual constructed by the statistical method does not approximate the actual metric trend (e.g., there is a slope in the curve before deployment while it should be flat). The system may determine that qualified control regions cannot be identified because there are no regions meeting the metric-based qualification criteria. The system can avoid unreliable or mistaken inference from the automatic measurement results which are based on the assumed existence of qualified control regions and avoid non-optimal network deployments. In such situations, the system may indicate that the impact cannot be effectively measured because lack of qualified control regions and may indicate that the automatic inference assuming the existence of control regions may be not reliable. As another example, the system may determine that the synthetic controls method fails when the error bar indicating uncertainty is above a predetermined threshold. As another example, the system may identify the failure of the synthetic controls method because of recall problems or prevision problems. The system may determine the situations in which: (1) the deployment impact cannot be measured; (2) nothing actually happens after the deployment (e.g., the measured results are caused by noise); (4) there are network metric changes after the deployment but the measurement result is low in confidence level because the change may be within range of error.

Figure 2B:
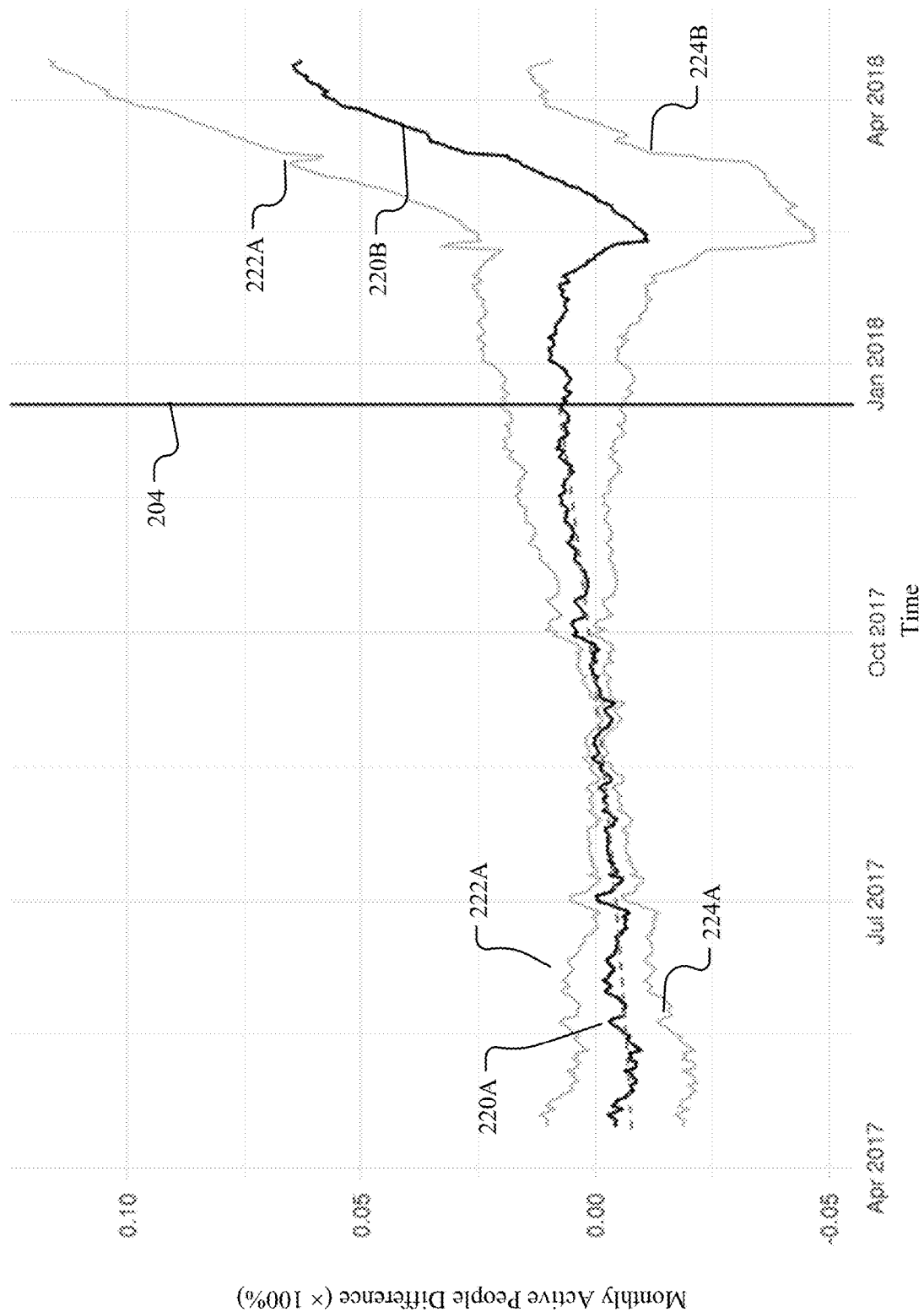
FIG. 2B illustrates an example network metric matching result when qualified control regions cannot be identified.

FIG. 2B illustrates an example network metric matching result when qualified control regions cannot be identified. As an example and not by way of limitation, the system may measure the deployment impact for a 12-month time window (e.g., with a 6-month time period before the deployment time 204 and a 6-month time period after the deployment time 204). The system may collect the network performance data over these time periods and calculate the MAP values over these time periods for the candidate control regions and the region of interest. Then, the system may calculate the MAP value difference of the candidate control regions and the region of interest as illustrated in the curve 220A for the pre-deployment time period and as illustrated by the curve 220B for the post-deployment time period. The curves 222A-B and 224A-B may indicate the range of the MAP difference values with a 95% confidence level. The curve of the MAP difference 220A-B may be divided by the deployment time 204 into the pre-deployment portion 210A and the post-deployment portion 210B. The system may determine whether a candidate control region is a qualified control region based on the pre-deployment MAP difference (e.g., 220A) and one or more qualification thresholds. For example, the system may use pre-deployment patterns of the difference between the counterfactual estimated by the synthetic controls method and the deployment regions to determine qualification of control regions. In particular, difference curve 220A may be upward sloping during the pre-deployment period, exhibiting that the metric in deployment regions grew faster than the metric in control regions during the pre-deployment period. Therefore, the control regions may not be similar enough to deployment regions. The system may then determine that the chosen control regions cannot be used for effective inference on the impact of deployments.

Small Regions

In particular embodiments, the system may measure the deployment impacts in regions of different sizes, for example, countries, cities, states/provinces, towns, villages, settlements, tiles, zip code areas, kilometer-level regions, etc. An impacted region may be characterized by a location and a radius. In particular embodiments, the region of interest or impacted region can be relatively small in size (e.g., zip code areas, kilometer-level regions, hour-level regions, etc.) and therefore contain relatively small number samples for collected data (e.g., small MAP number, less network traffic, small number of samples, etc.) Accurately measuring deployment impact in these regions can be technical difficult for traditional system and methods because a smaller number of sample may result in less stable or/and reliable network metric determination. For example, a network metric relying averaging from all samples of the region (e.g., average network speed) may be less stable or/and reliable when it is calculated for a smaller region than the corresponding metric calculated for a larger region which includes larger number of samples. A less stable or reliable network metric may result in inaccurate measurement baselines and consequently less accurate measurement results. In particular embodiments, the system may identify a number of control regions (e.g., using causal inference methods including synthetic controls) and may determine a weighted combination of the control regions for determining the network metric baseline. By accessing data sources including internet (e.g., social networks) usage data and using the weighted combination of a number of control region and, the system may improve the accuracy of the determined baseline (e.g., based on the total number of samples in all of these control regions) and therefore improve the measurement accuracy for measuring deployment impact in relatively small regions. Particular embodiments of the system may improve the accuracy for measuring the deployment impact over regions with all sizes (e.g., countries, cities, states/provinces, towns, villages, settlements, tiles, zip code areas, kilometer-level regions, etc.) In particular embodiments, the system may limit the smallest measurable region to the size of 1.2 km×1.2 km.

Cross Network Aggregation

In particular embodiments, the MAP may include all users in the deployment regions (e.g., across all carriers) excluding account from double-counting. When double-counting is excluded, the system can sum across deployments to calculate overall incremental number of internet users. In particular embodiments, the system may sum all impacts, including positive or negative (regardless of statistically significant or not) to determine the overall impact to maximize impact accounting. In particular embodiments, the system may only sum the positive and negative impacts that are statically significant. In particular embodiments, the system may only sum positive impacts that are statistically significant to improve the statistical significance accuracy.

In particular embodiments, the system may aggregate multiple deployments by estimating covariance terms between deployments since the system cannot assume independence across deployments because of common factors (e.g., such as seasonality) affecting deployments.

Deployment Categories

In particular embodiments, the system may measure the impact of a number of deployments of different categories. For example, a deployment may add Wi-Fi connection for a region where there is no internet connection before the deployment. As another example, a deployment may add one or more cellular towers to a region where there is no connectivity from any carrier in this region before the deployment. In these cases, no baseline can be established since there is no internet connection before the deployment. As another example, a deployment may add new Wi-Fi connection to a region where there are preexisting internet connections by other carriers. As another example, a deployment may add one or more new cellular towers to a region where there are preexisting cellular towers from other carriers. As another example, a deployment may add one or more new cellular towers to a region where there are preexisting overlapping cellular towers from the same carrier. As another example, a deployment may upgrade one or more existing cellular towers to a new technology. As another example, a deployment may add more network capacity to existing cell towers without changing technology. As another example, a deployment may expand a preexisting network in a region. In these cases, the network metrics of the preexisting network(s) may be used to determine the baseline for measuring the deployment impact.

Hold-Out Experiments

Figure 3:
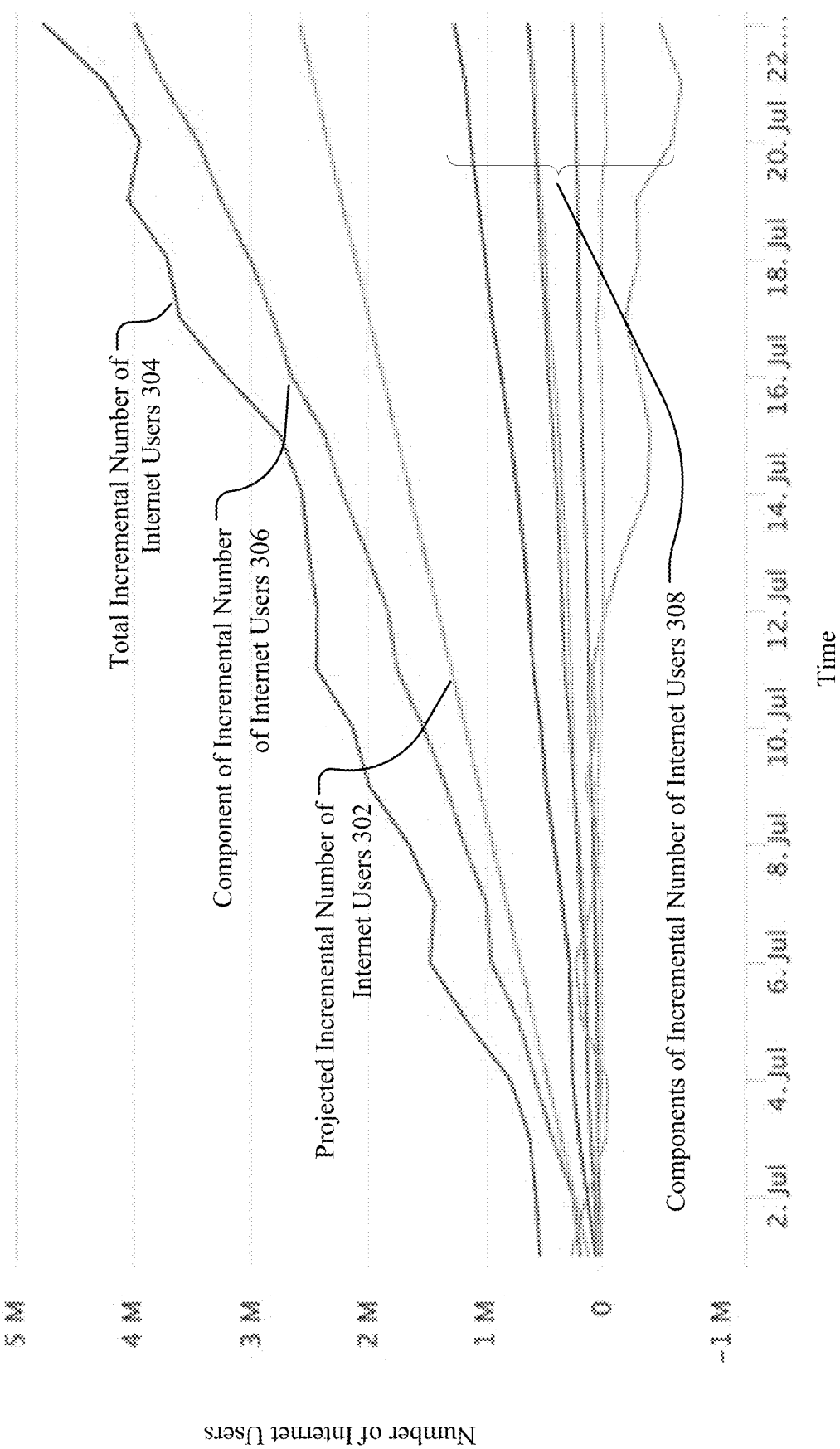
FIG. 3 illustrates example results of incremental number of internet users determined based on the data collected from long-term hold-out experiments.

FIG. 3 illustrates example results of incremental number of internet users determined based on the data collected from long-term hold-out experiments. In particular embodiments, the system may use a number of hold-out regions as the control regions for measuring deployment impacts. The hold-out regions may be regions which are excluded from the deployment during long-term holdout experiments. The system may collect data from both hold-out regions and impacted regions and calculate incremental number of internet users for measuring deployment impacts. In particular embodiments, the system may use a group of randomly selected hold-out regions as control regions to determine the incremental number of internet users baseline. The holdout regions may be randomly selected in a way similar to A/B test. The system may assume the regions impacted by the deployment would have been approximated by the hold-out regions if the deployment is not deployed. In particular embodiments, the system may use short-terms outcomes to predict long-term impact (e.g. impact on the number of active internet users) and use third-party data to correct bias for data collected from particular customers (e.g., customers of device manufactures participating the program). As an example and not by way of limitation, the system may determine a projected incremental number of internet users 302 based on the hold-out regions as the baseline for measuring the deployment impacts, as illustrated in FIG. 3. The system may determine a number of components (e.g., 306, 308) of the incremental number of internet users based on the data collected from the hold-out experiments and determine a total incremental number of internet users 304 based on the components (e.g., 306, 308) of the incremental number of internet users. The system may measure the deployment impact by comparing the total incremental number of internet users 304 of the region of interest to the projected incremental number of internet users 302. The difference between the total incremental number of internet users 304 and the projected incremental number of internet users 302 may indicate the degree of the deployment impact. The system may measure the deployment impacts by comparing one or more components (e.g., 306, 308) of the incremental number of internet users to the projected incremental number of internet users 302. The components (e.g., 306, 308) of the incremental number of internet users may correspond to different type of regions, for example, zero-rating regions, SMS bind regions, etc.

As another example and not by way of limitation, the system may determine the incremental number of internet users for a deployment taken on a particular date based on data collected from the hold-out experiments. The system may determine that the number of internet users shows an 8% increase during the first month after the deployment, and the lift decreases to 2% in the second month and disappears after 60 days. The system may use a 5% significance threshold for determining whether an impact is significant. The system may determine that the deployment only generate significant impact (e.g., increasing of the number of internet users) during the first 60 days and the impact decreases to a non-significant level after the first 60-day time period.

Growth Accounting

In particular embodiments, the system may measure the deployment impacts by comparing one or more post-deployment network metrics of an impacted region to the corresponding the pre-deployment network metrics of that impacted region. The system may assume that the pre-deployment network metric trends would have continued in the region of interest if the deployment was not taken on the region of interest. In particular embodiments, the system may use customer transition metrics (e.g., new customer number, churned customer number, user churning rate, resurrected customer number, etc.) in the impacted regions to measure the deployment impacts. The system may determine a user churn rate which may be a percentage of subscribers or users who discontinue their subscriptions within a given time period. An impacted region may be characterized, for example, by a circle area determined by an impact radius and a deployment location. In particular embodiments, the system may determine incremental number of internet users based on the customer transition metrics using a geographic prediction algorithm and may divide the customer transition metrics at carrier level. For example, the system may determine the incremental number of internet users based on the number of customers in each transition category (e.g., new customer, resurrected customer, churned customer, etc.). The system may perform a precise impact measurement by comparing the pre-deployment trends and the post-deployment trends.

Figure 4A:
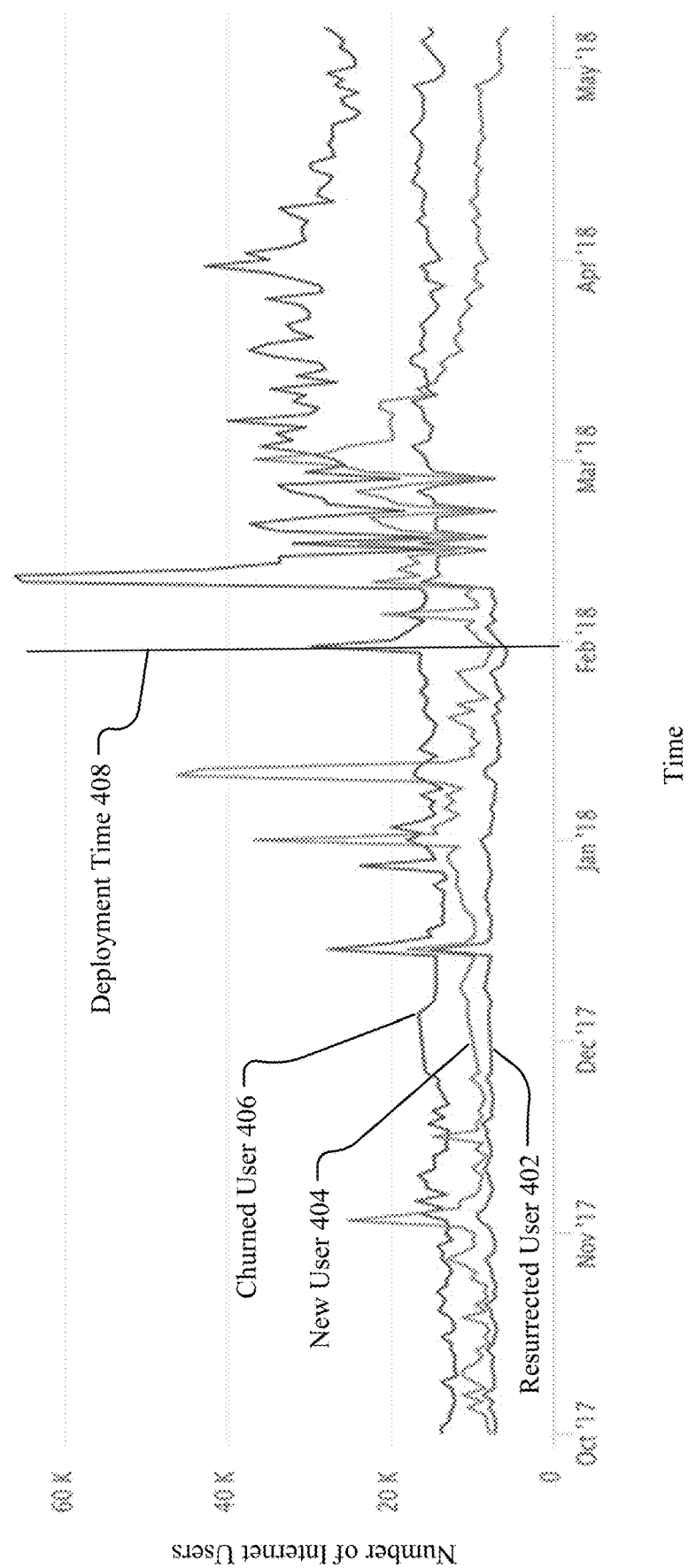
FIG. 4A illustrates example results of overall impacts of cell tower upgrades on incremental number of internet users of a region of interest as relates to growth accounting.
Figure 4B:
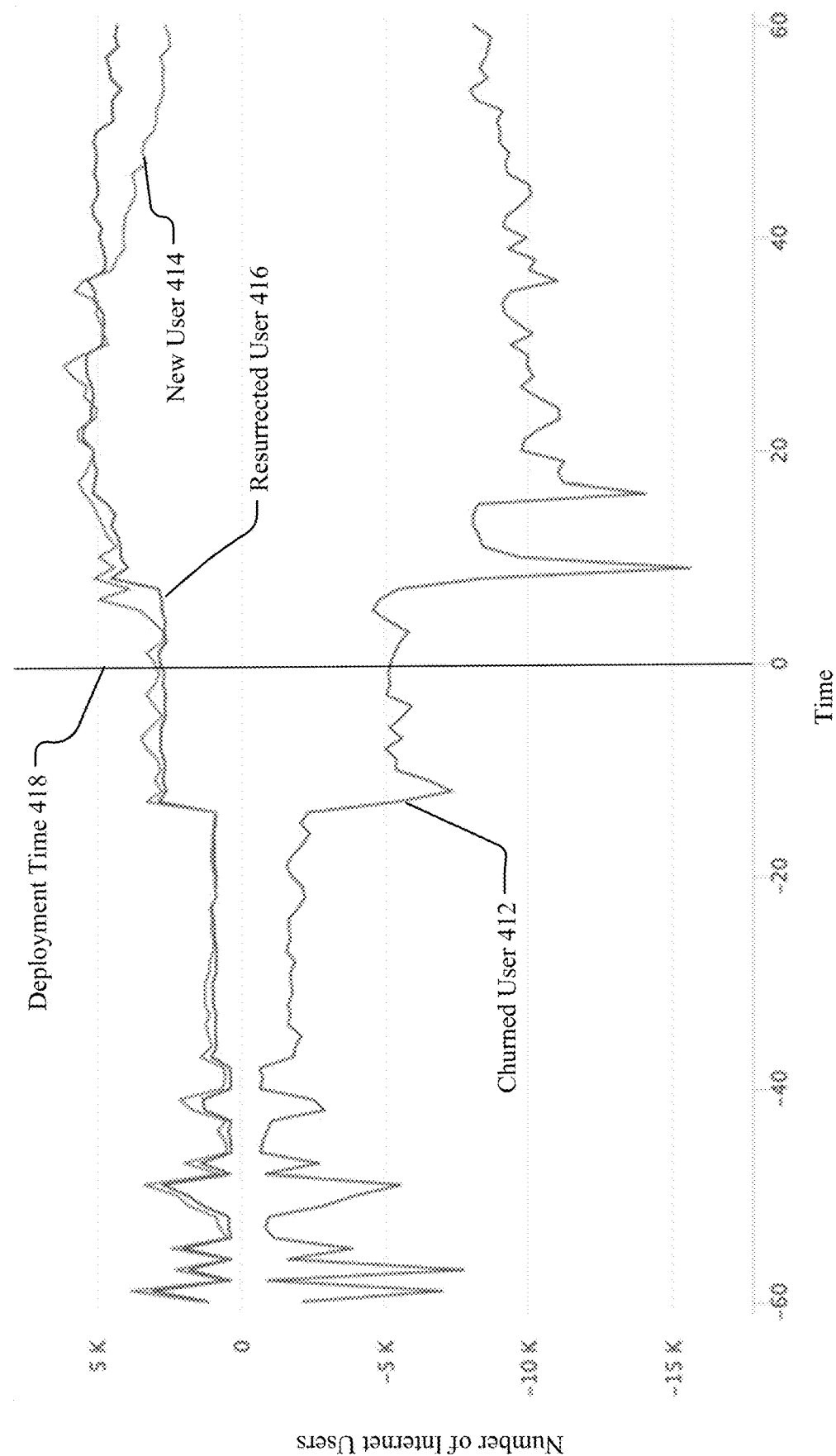
FIG. 4B illustrates example results of overall impacts on incremental number of internet users aggregated over multiple cell tower upgrades.

FIG. 4A illustrates example results of overall impacts of cell tower upgrades on incremental number of internet users of a region of interest as relates to growth accounting. The system may collect data from the region of interest for a 7-month time period around the cell tower upgrade deployments. The system may determine the number of internet users (e.g., MAP) related to new user 404, resurrected user 406, and the churned user 402 both before and after the deployment time 408. FIG. 4B illustrates example results of overall impacts on incremental number of internet users aggregated over multiple cell tower upgrades. The system may aggregate over cell tower upgrades to show the incremental number of internet users (e.g., churned user 412, new user 414, resurrected user 416) for a 60-day period before and a 60-day time period after the deployment time 418.

Incremental Number of Users Experiencing Better Network Speed

User-Level

In particular embodiments, the system may determine incremental number of internet users experiencing faster network speed to measure the impacts of deployment taken on communication networks. The system may prioritize and optimize future network connectivity deployments for improving network speeds based on the measured deployment impacts. The system may dramatically improve the decision-making process for prioritizing connectivity deployments based on accurate measurement results. The system may determine the number of internet users experiencing faster network speed of the impacted regions based on one or more network metrics including, for example, but not limited to, network speed, latency, time spent, etc. In particular embodiments, the system may compute the number of people that are impacted by a speed improvement deployment and perform user level speed measurement on the deployment impact. In particular embodiments, the system may measure the network speed as experienced by the user either at deployment program level or at a geographic location that is impacted by the deployment program. In particular embodiments, the system may determine the variation in the network metrics before and after the deployment using various methods depending on the type of deployment. For example, if a deployment is deployed in a region where there is no network coverage pre-deployment, the system may only count incremental number of internet users and exclude the incremental number of internet users experiencing faster network speed to avoid double-counting.

Tile and AP Level

In particular embodiments, the system may measure download speed within the impacted region at tile level when the location of the deployment/intervention is known. The tile level measurement may be consistent across different deployment programs and may provide a consistent way to measure incremental number of internet users experiencing faster network speed. In particular embodiments, the system may measure the download speed at access point (AP) level when the identifiers of the APs are known. The system may determine the changes or shifts in the distribution of download speeds over a set of pre-determined speed buckets defined for pre and post the deployment network speeds. As an example and not by way of limitation, the system may determine that the speed distribution over the set of download speed buckets has changed significantly after the deployment. The system may measure the deployment impacts based on the speed distribution changes (e.g., moving from the lower speed buckets to higher speed buckets). As another example, the system may determine that the speed distributions over the set of speed buckets has not changed significantly after upgrading the network and the system may determine that the reason why there are no significant changes in the speed distribution. For example, the system may determine that 95% of the requests are from 4G cells before deployment which means that even before the upgrades this region was 4G dominated and the deployment of adding more 4G did not change the speed distribution significantly.

Measure Download Speed

Figure 5:
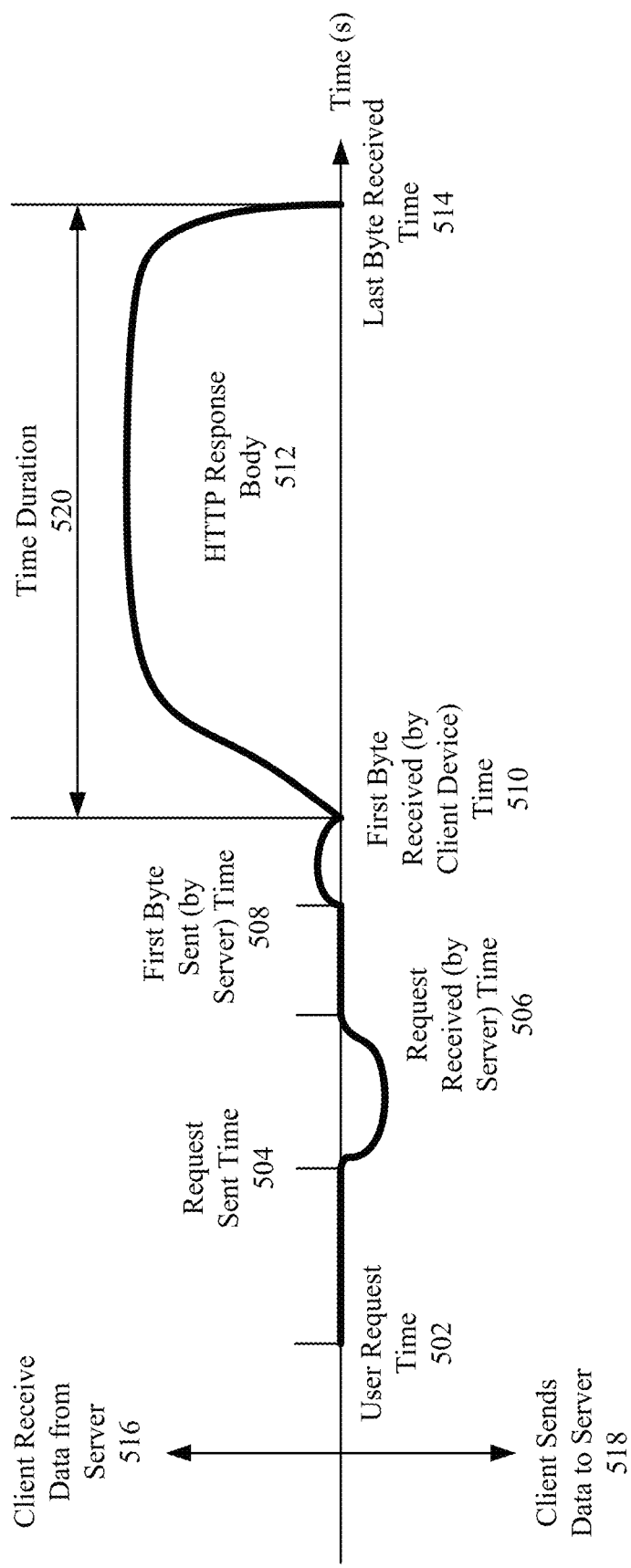
FIG. 5 illustrates an example process for measuring download speed based on an end to end measurement of HTTP request.

FIG. 5 illustrates an example process for measuring download speed based on an end to end measurement of HTTP request. In particular embodiments, the system may use download speed (e.g., in kbps/Mbps) as the network metric for measuring deployment impacts across different deployment programs. The download speed may be used for measuring quality of experience of network users. The input data may be logged by download speed measurement instrumentations based on a 1% sample of requests from location services enabled users (e.g., while the applications are running in the foreground). The system may share the same data source used by a network insights (NI) system. In particular embodiments, the system may use custom instrumentation to measure the network download speed and latency for sample requests using an end to end measurement of HTTP request (e.g., from social network server to client device).

As an example and not by way of limitation, the system may measure the download speed from an end to end HTTP request and response process. As illustrated in FIG. 5, the area 516 above the time line may be corresponding to the process for client device receiving data from a server and the area 518 below the time line may be corresponding to the process for the client device sending data the server. A user request may be generated at the user request time 502, for example, when a user pulls social network news feeds. The user request may be sent from the user device (e.g., smartphones, tablets, computers) at the request sent time 504 to a server of the social network platform. The server may receive the request at the request received time 506 and start to send the first byte of data at the first byte sent time 508. The client device may receive the first byte from the server at the first byte received time 510. Then the server may start to transmit the HTTP response body (e.g., video contents, news content) to the client device. The client device may receive the last byte of the HTTP response body 512 at the last byte received time 514. The system may determine the download speed by dividing the size of the HTTP response body 512 to the time duration 520 used to transfer the HTTP response body. The HTTP request-based measurement may be lighter than the traditional throughput measurements that assess the maximum network capacity. In particular embodiments, the system may remove the samples with HTTP response body size that is less than 12 Kbit to remove ramp up effect.

RTT Latency

Figure 6:
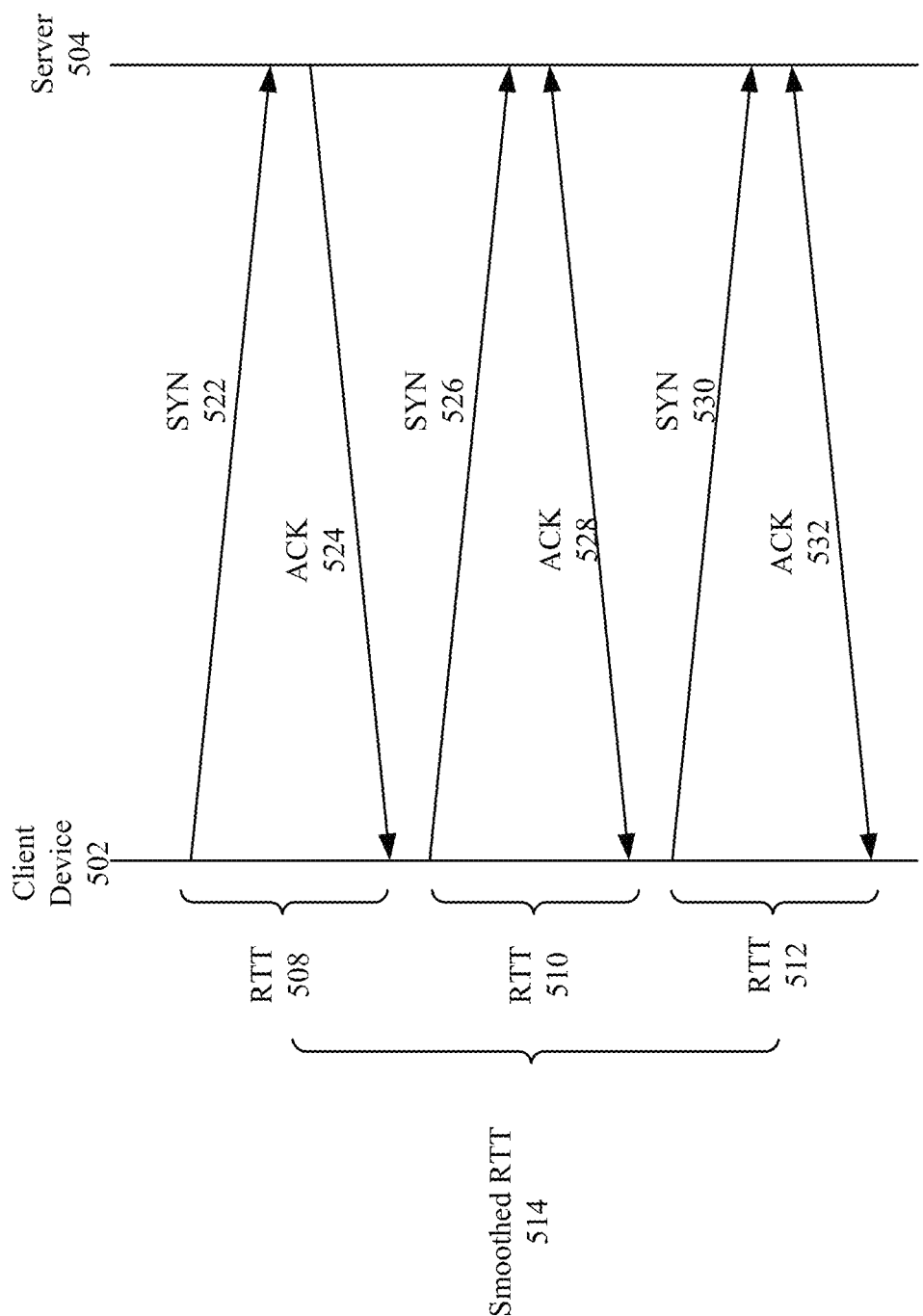
FIG. 6 illustrates an example process for measuring round trip time (RTT) latency.

FIG. 6 illustrates an example process for measuring round trip time (RTT) latency. In particular embodiments, the system may use round trip time (RTT) to determine the network latency for measuring the impact of deployment. The system may track raw latency measurement or use smoothed/averaged latency measurement as the latency metric. As an example and not by way of limitation, a connection may be established between a client device 502 and a server 504, through a 3-way handshake with synchronization packet (SYN) and synchronization acknowledge packet (ACK). The client device 502 may first send a SYN packet 522 to the server 504 which may send back to the client device 502 an ACK packet 524 when it receives the SYN packet 522. Then, the RTT 508 may be calculated when the client device 502 receives the ACK packet 524. The client device 502 may consequently send the SYN packets 526 and 530 to the server 504 and may receive the corresponding ACK packets 528 and 532 from the server 504.

Due to the network type and the timing difference when the client device sends the SYN packet, the individual RTT measurement based on a single pair of SYC-ACK may have large variances. To solve this problem, the system may use a smoothed RTT to measure the latency in a way similar to a weighted moving average. The system may take the recent history of RTTs of a given connection into account in calculating the overall RTT. For example, the system may determine three RTTs (e.g., 508, 510 and 512) based on the three pairs of SYN-ACK packets (e.g., 522-524, 526-528, 530-532) and determine the smoothed RTT 514 based on an average or a weighted average of the three RTTs of 508, 520 and 512. Since this methodology measures end to end latency from social network servers to the users' devices as experienced by the users, the measured results on the network performance may be impacted by the network type, internet infrastructure, social network servers, or caching mechanisms. In particular embodiments, the system may use downstream latency to measure the network latency. The downstream latency may be defined as the time to first byte received for sampled request on client devices of the social network users, minus the server processing time.

Time-Spent

In particular embodiments, the system may use time-spent as the network metric to measure the impact of deployment. The time-spent may indicate the amount of time spent on the network by users. The system may sum the time-spent across time, space and users and use the total time-spent or average time-spent for an area as the network metric in a way similar to the number of internet users (e.g., MAP). In particular embodiments, the system may use time-spent as the third metric to report across programs in addition to incremental number of internet users and incremental number of internet users experiencing faster network speed. The system may determine the time-spent of users that are assigned by a geographic prediction algorithm to a certain region impacted by a deployment. The system may determine time-spent of each user from the internet (e.g., social networks) usage data and the network performance growth data. The system may use session level instrumentation to trace all sessions that are measured on an AP without user information. In particular embodiments, the system may use the number of people on line at the same time as a network metric to measure the impact of the deployment.

Figure 7:
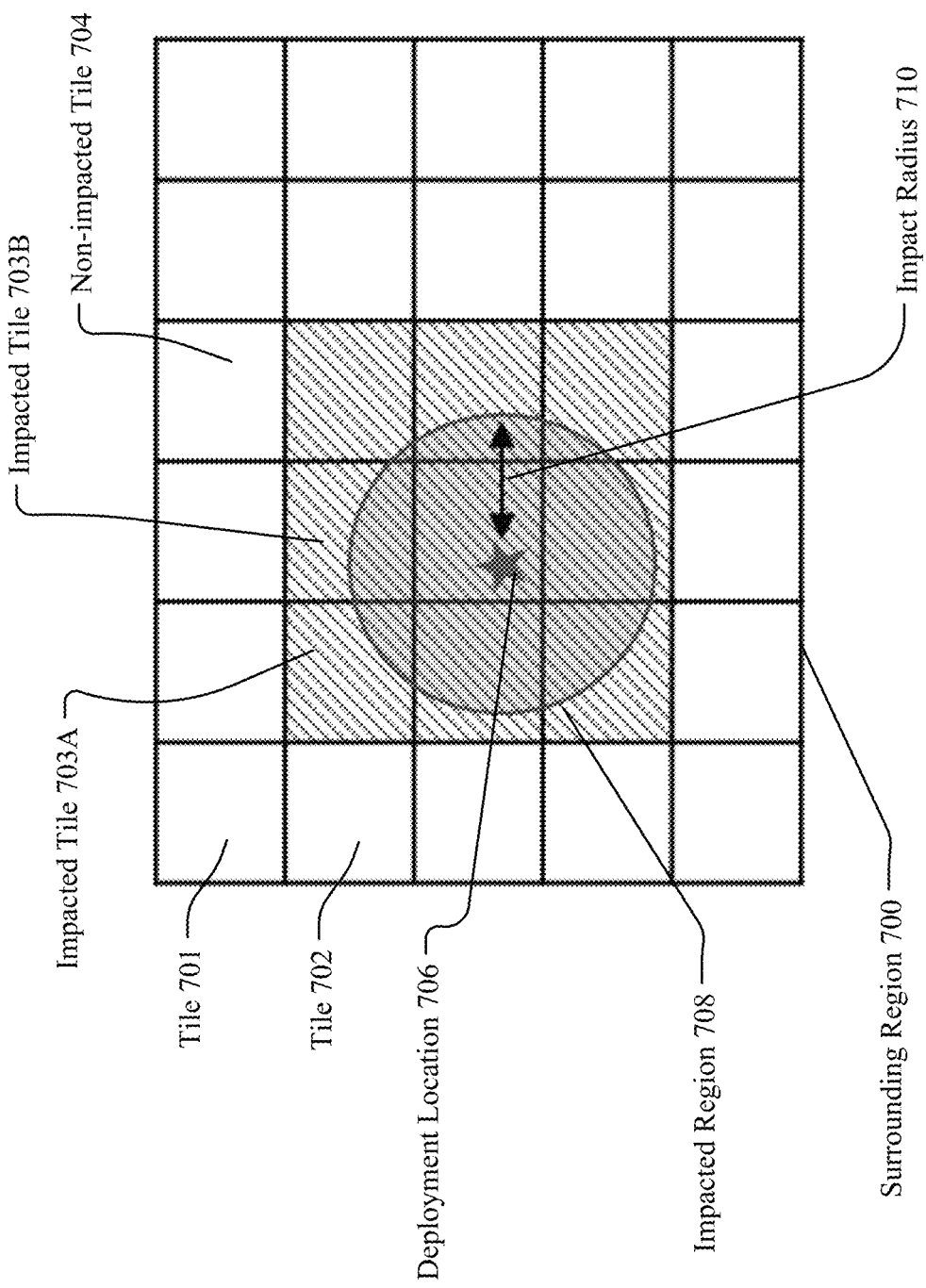
FIG. 7 illustrates an example process for determining impacted tiles.

Measurement Process of Incremental Number of Users Experiencing Better Network Speed Step 1: Data Gathering FIG. 7 illustrates an example process for determining impacted tiles. In particular embodiments, the system may first gather the deployment information (e.g., deployment location 706, impacted radius 710, etc.) from deployment program or from deployment partners. The system may determine the impacted region 708 by determining a circle area based on the deployment location 706 and the impact radius 710. The system may divide the surrounding region 700, which includes the deployment region 708 into a number of tiles (e.g., 701, 702, 703A, 703B, 704, etc.). The tile may be in rectangular or square shape and may be at certain map zoom levels (e.g., map tile zoom level 14). The system may determine any tiles (e.g., 703A, 703B) as the impacted tile when they overlap with the circle area of the impacted region 708 for at least a portion of the tile area. Then, the system may determine the network speed for a time period pre-deployment and measure the network speed change for a time period after the deployment. In particular embodiments, the post deployment time period may end when network metrics of interest have become stable over time.

Step 2: Determine Speed Distribution Changes Over Speed Buckets

In particular embodiments, the system may establish one or more pre-deployment baselines for one or more network metrics and compare post-deployment speed to the pre-deployment baselines to determine whether there are significant changes in the network speed. In particular embodiments, the system may compare the pre and post network performance based on changes in user experience of the impacted users. In particular embodiments, the system may compare the pre and post network performance based on changes in the network speed distribution of the impacted regions. In particular embodiments, the system may measure network speed using user-based measurement to measure the network speed improvement as experienced by individual users. In particular embodiments, the system may measure network speed using location-based speed measurement instead of user-based speed measurement to measure user experience improvement of different locations (e.g., tiles). In particular embodiments, the system may measure the network speed based on download speeds measured from cell tower using client-side instrumentations.

In particular embodiments, the system may measure the deployment impacts based on incremental number of internet users experiencing faster network speed by determining network speed distribution changes over a pre-determined set of speed buckets. For example, the system may define a number of speed buckets corresponding to different user experience levels, such as, Very Poor: <0.5 Mbps; Poor: 0.5~1 Mbps; Fair: 1~1.5 Mbps; Good: 1.5~5 Mbps; Very good: 5~15 Mbps; Great: >15 Mbps, etc. The speed buckets may correspond to typical speeds of different technologies (e.g., 2G, 3G, 4G, 5G) and different streaming content (e.g., general web surfing with no videos, standard definition videos, online gaming, HD video, 4K video, etc.). The deployment impact may be determined based on moving the distribution of requests to higher speed buckets from lower speed buckets over time. For example, a region with 10M MAP may have 30% of requests served within Good speed bucket or above prior to an intervention or deployment and may have 50% within Good speed bucket or above after the intervention or deployment. In this case, the system may determine that the deployment has helped to improve speeds for 10M people by bringing an additional 20% of sessions to Good or higher internet speed bucket.

In particular embodiments, the system may use more generalized speed bucketing scheme. In particular embodiments, the system may, for a given deployment, allow the users to alter these buckets to customize the bucket-based or threshold-based measurement. For example, the system users may specify that a first deployment should move the download speeds of a certain number of customers to above 1.5 Mbps and a second deployment should move the download speeds of a certain number of customers to above 5 Mbps. The system may determine the group of buckets based on the approximate download speeds required for streaming different types of internet content (e.g., general web surfing with no videos, SD videos, online gaming, HD video, 4K video, etc.). The system may select different buckets for different deployment programs to move users into these selected buckets based on their specific goals. For example, a deployment (e.g., Terragraph) may seek to move users to the fastest tier of usage, while other deployment programs may aim to get users to Fair speed bucket and above. In particular embodiments, the system may optimize the network speed buckets to avoid incentivize multiple gradual improvements against large improvement in short term. The system may determine the speed bucket depending on the type of network and deployment (e.g., cellular, Wi-Fi, carrier-specific or all carrier level, etc.).

Figure 8A:
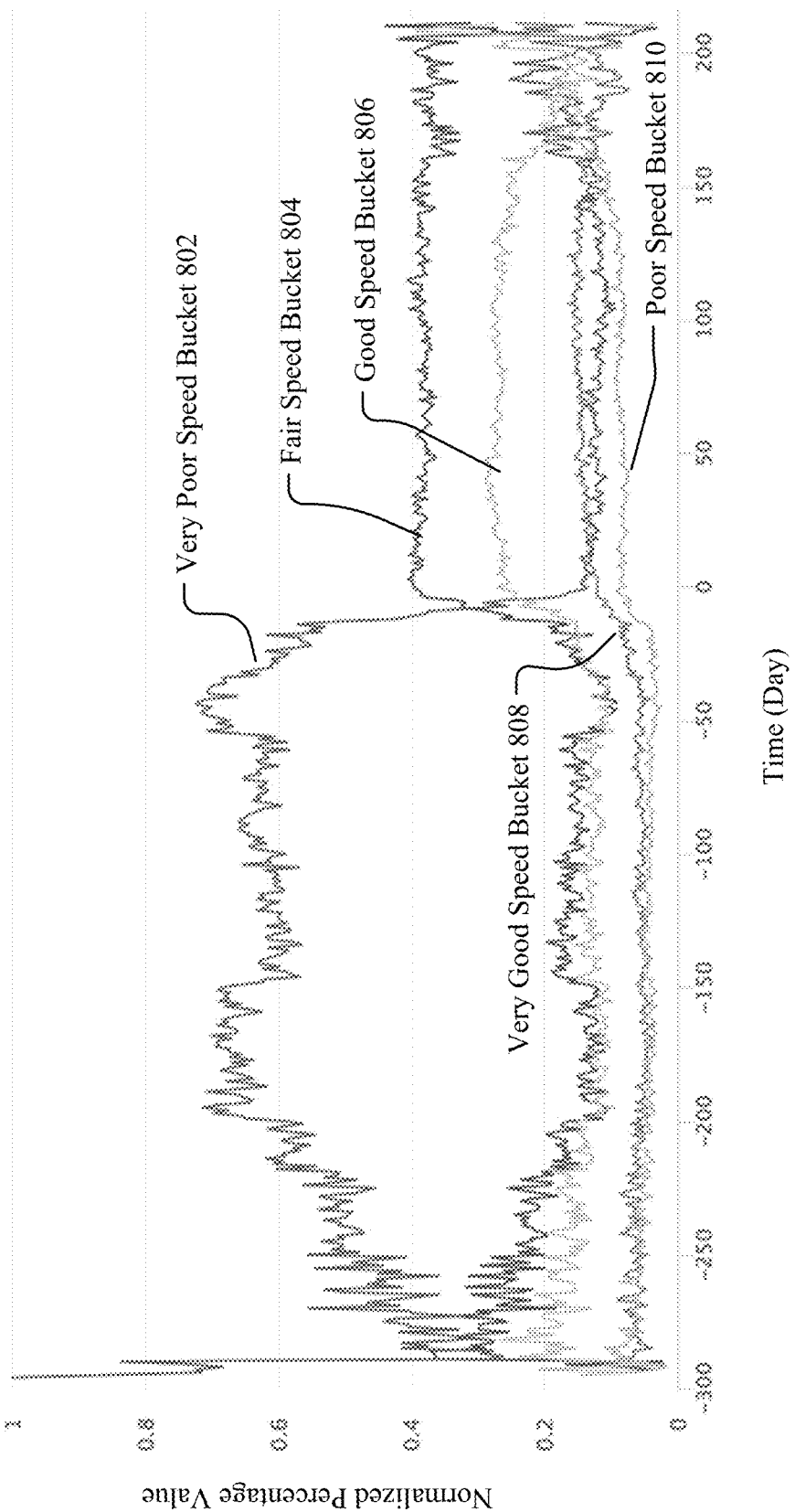
FIG. 8A illustrates example network speed distribution changes over a set of speed buckets for a region of interest before and after a network deployment.

FIG. 8A illustrates example network speed distribution changes over a set of speed buckets for a region of interest before and after a network deployment. As an example and not by way of limitation, the system may measure the network speed for a 300-day time period before the deployment and a 200-day time period after the deployment. The system may measure the download speed at AP level when the identifiers of APs are known or may measure the download speed at tile level when the location of the deployment is known. The system may determine the percentage each speed bucket of a set of speed buckets (e.g., Very Poor: <0.5 Mbps; Poor: 0.5~1 Mbps; Fair: 1~1.5 Mbps; Good: 1.5~5 Mbps; Very good: 5~15 Mbps). As shown in FIG. 8A, the percentage value of the network speed of Very Poor speed bucket has decreased from 60% to about 16% while the percentage value of Fair speed bucket has increased from 15% to 40% and the Good speed bucket has increased from 14% to 30%. Therefore, the system may determine that the deployment impact has moved the network speed distribution from lower speed bucket to higher speed buckets (e.g., from Very Poor to Fair and Good speed buckets).

Figure 8B:
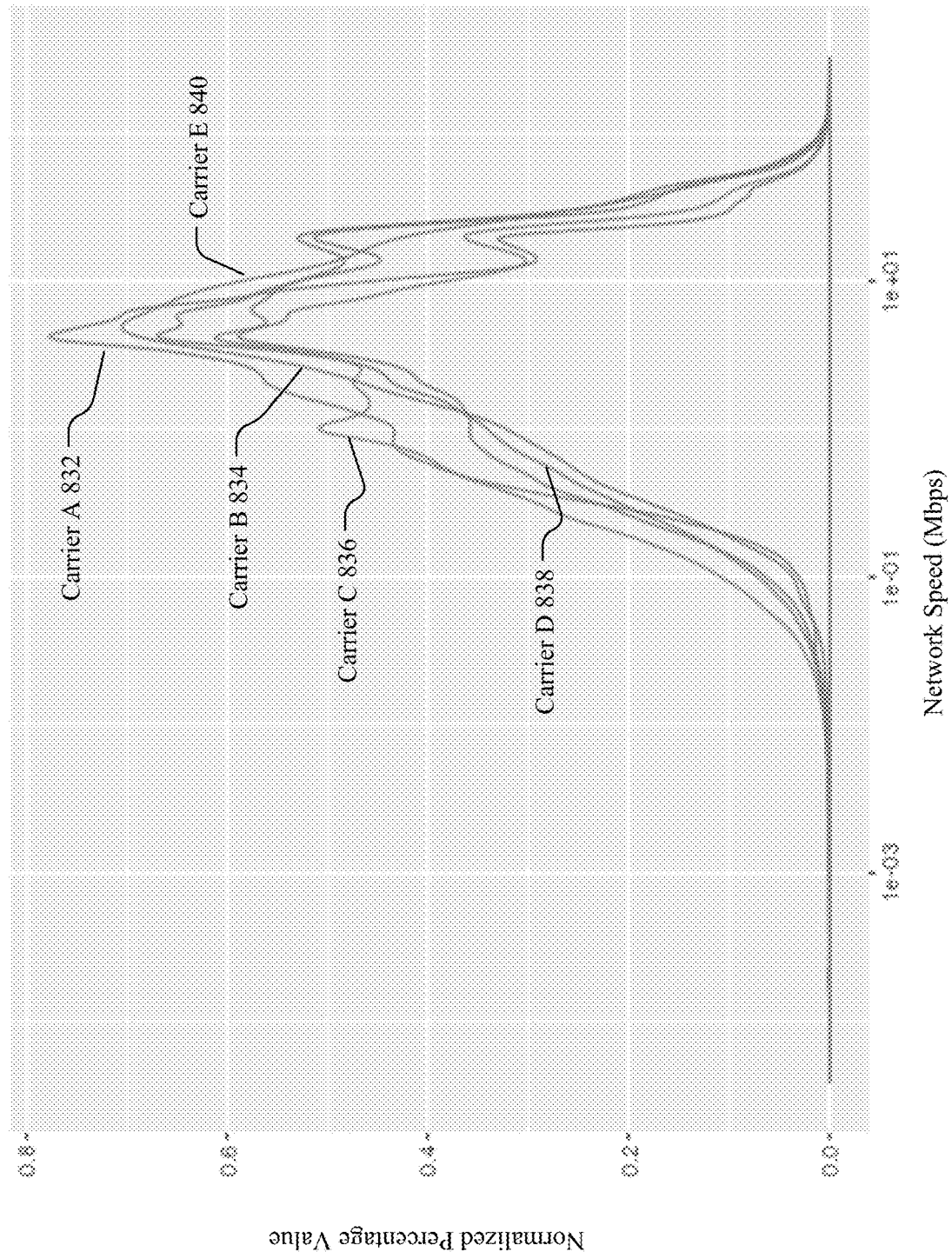
FIG. 8B illustrates example results of network speed distribution of a number of carriers.

FIG. 8B illustrates example results of network speed distribution of a number of carriers. As an example and not by way of limitation, the system may determine the network speed distribution by calculating the normalized percentage value over the network speed value for a number of carriers (e.g., carrier A 832, carrier B 834, carrier C 836, carrier 838, carrier 840). The system may illustrate the percentage distribution using the network speed distribution curves, as shown in FIG. 8B. The network speed distribution curves show that the majority of users of these five carriers may experience network speed in the range of 0.1 Mbps to 15 Mbps. For measuring deployment impact on a particular carrier, the system may calculate and determine the network distribution curves before and after a deployment to determine the network speed distribution changes caused by the deployment.

Step 3: Determine Significance

In particular embodiments, the system may determine whether the network speed changes are statistically significant based on a significance threshold. The network speed may need to shift from the lower speed bucket to higher speed buckets in a large enough amount to be considered as significant. The threshold may be predetermined for each methodology. For example, the system may use a significance threshold of 20% to determine whether a network speed shift is significant. A first region of interest impacted by the deployment with 5% speed improvement may be determined as not significant. A second region of interest impacted by the deployment with 25% speed improvement may be determined as significant. In particular embodiments, the system may use the same significance threshold for multiple network deployments. For example, the system may use a consistent threshold of moving 20% of speed from lower to higher speed buckets. In particular embodiments, the system may determine the significance threshold based on the deployment properties (e.g., type, location, launch date, durations, targets) to allow different deployments to be evaluated using different significance thresholds. In particular embodiments, the system may use data-science-based method to compare the distribution of speed uniformly to determine the significance thresholds. If the speed has increased significantly, the system may determine the impact is statistically significant and compute the incremental number of internet users experiencing faster network speed by summing the number of monthly active users on the carrier/ISP traffic in the impact regions.

Step 4: Outputs Results

When the network speed shift is significant, the system may determine that the deployment can accrue to the network connectivity goals. When the network speed shift is not significant, the system may determine that the deployment cannot accrue to the network connectivity goals. The system may compute the incremental number of internet users experiencing faster network speed if the network speed shift is significant. The system may compute the incremental number of internet users experiencing faster network speed on the impacted carrier/ISP traffic for the post deployment time period. To convert the samples from measurement instrumentation into user counts, the system may determine a distribution of speeds experienced by users for their different requests. Some user requests could be resolved at very good network speeds while other users may experience the network speed as fair. The system may assume that all users in a given area of a given carrier experience the same distribution of network speeds. When the distribution shifts to higher speeds, all MAP in that region may be impacted. The system may compare the distributions of download speeds across different carriers in a small region of interest. At last, the system may generate impact statement for each deployment. For example, the system may generate a statement of "an area with 10M MAP has 30% of requests at Good speed or above prior to an intervention, and 50% after the intervention". The system may report the result as "the deployment resulted in increased speeds for 10M people by bringing 20% of user requests to Good and better network speed from Fair and worse network speed."

Speed Metric Bucket Baseline

In particular embodiments, the system may use different baselining methods for carrier-specific and carrier-agnostic methods depending on whether the history data (e.g., speed distribution) over the impacted tiles or over the impacted users are tracked. The system may optimize the selection of the baselining methods based on the trade-off between precision of the estimation method and the complexity of the data required. In particular embodiments, the system may use tile-level methods when data sources for user-carrier matching and per-user metric measurement are not validated. In particular embodiments, when user-level data sources are reliable, the system may use user-level method to measure the impact of the deployment. In particular embodiments, the system may measure network metrics (e.g., speed distribution) of all active carriers in deployment tiles.

Carrier-Specific Methodology

In particular embodiments, the system calculate the incremental number of internet users experiencing faster network speed using multiple types of methodologies, for example, carrier-specific methodology, carrier-agnostic methodology, user-based methodology, tile and all-carrier-based methodology, etc. For carrier-specific methodology, the system may track the network metrics based on the tiles of a particular carrier in the deployment region. The system may determine the impacted population by identifying the users who are assigned to the deployment carrier (e.g., as their primary carrier) and assigned to the deployment tiles by a geographic prediction algorithm. For example, the system may determine the network speed distribution changes before and after deployment for the specified carrier and compare the distribution of speed pings for that carrier in the deployment tiles for a first time period (e.g., 60 days) before the deployment and a second time period (e.g., 60 days) after the deployment.

Carrier-Agnostic Methodology

For the carrier-agnostic methodology, the system may track the network metrics based on the tiles of all carriers in the deployment region. For example, the system may determine the representative network speed distribution before deployment and compare the pre-deployment distribution to the speed distribution of the deployed Wi-Fi access points or cell towers of all carriers after deployment. The system may compare the distribution of speed pings for all carriers in the deployment tiles for a time period of 60 days before the deployment and the distribution of speed pings for deployment carrier in the deployment tiles for a time period of 60 days after the deployment.

User-Based Methodology

For user-based methodology, the system may determine the user experience changes before and after the deployment for impacted users. For example, the system may identify the impacted users by the usage of the deployed Wi-Fi access points or cell towers. The system may determine speed distribution of the impacted users of all carriers for a 60-day time period before the deployment to determine the baseline. The speed distribution may be weighted by the number of users using each carrier. The system may compare the speed distribution of a 60-day time period before the deployment to the speed distribution of a 60-days time period after the deployment. The system may provide better precision by using user-based methodology. For tile and all-carrier based methodology, the system may determine the impacted population by identifying the users assigned to the deployment tiles by a geographical prediction algorithm. For example, the system may determine the user experience change before and after deployment for the impacted users of all of the carriers in the deployment region. The system may determine and compare the distribution of speed pings for all carriers in the deployment tiles for the 60-day time period before and the 60-day time period after the deployment. Using this tile and all-carrier-based methodology, the system may capture any competitive response from other carriers after deployment. In particular embodiments, the system may use the quasi-experimental method (e.g., causal inference methods including synthetic controls) or the pre-post comparison method (e.g., growth accounting method) to measure the incremental number of internet users, and may use carrier-level incremental number of internet users measurement as sanity checks.

Cross Programs Aggregation

In particular embodiments, the system may determine across program sum-ability and sum the incremental number of internet users experiencing faster network speed across multiple deployments and network connectivity programs when appropriate. In particular embodiments, the system may group network latency into buckets in order to allow cross deployment and program comparison. For example, the system may use a number of latency buckets including, for example, but not limited to, Very poor: >300 ms; Poor: 150~300 ms; Fair: 100~150 ms; Good: 50~100 ms; Very Good: 0~50 ms, etc. The system may measure the network latency by using external data set that captures all internet traffic as to monitor latency globally. The system may make this measurement geo-specific through IP localization which is accurate on a city level. The system may use cell tower information as a primary source for latency comparison across programs.

In particular embodiments, the system may directly measure users who are brought to higher speeds using data sources for user-level speed measurement and different measurement methodologies. In particular embodiments, the system may provide a significance threshold for the impact of each program based on deployment baseline (e.g. at least 10% of requests moved to good speed or above). The significance threshold may be on speed, latency or/and time-spent. The system may determine the carrier level number of internet users (e.g., MAP) impacted by the deployment with significant speed improvements for each unit of their deployment (e.g. sites, pops, hotspots etc.). The system may determine that sites below the significance threshold will not contribute to the total number of internet users (e.g., MAP) experiencing faster network speed. The system may sum the number of internet users (e.g., MAP) experiencing faster network speed above the significance threshold across all programs to get the total impact. The system may generate statement such as "Deployment programs and partners have helped bring an estimated 10M people to significantly higher internet speeds." In particular embodiments, when user-level speed measurement is reliable, the system may sum the number of internet users (e.g., MAP) experiencing faster network speed in each speed bucket pre and post-deployment across multiple deployment programs based on user-level speed measurement.

Machine-Learning (ML) Models

In particular embodiments, the system may use a machine-learning (ML) model to determine or measure the incremental number of internet users or/and incremental number of internet users experiencing faster network speed of the deployment impact. For example, the system may use the ML model to preprocess the collected data and cluster the similar candidate control regions. The system may use the ML model to determine network metric trends pre and post deployment and match metric trends of candidate control regions to the region of interest to identify qualified control regions. As another example, the system may use the ML model to determine the significance threshold for the network metric changes and determine whether a network metric change is statistically significant. As another example, the system may use the ML model to determine the correlations (e.g., cause-effect relationships) between the deployment and particular impacts (e.g., MAP change, network speed changes, latency changes, time-spend changes). As another example, the system may use the ML model to aggregate number of internet users (e.g., MAP) cross multiple deployment programs. As another example, the system may use the ML model to generate the impact reporting statements.

User Interfaces

UI Overview

In particular embodiments, the system may measure the impacts of network connectivity deployments based on network metrics and methodologies as specified by a user through an interactive user interface (UI). The system may receive, from a client system and via the interactive UI, user inputs including one or more project constraints specifying at least a communication network and a geographic region of interest. The user interface may be operable to retrieve network-performance measurements of the communication network and a network deployment taken on the communication network. For example, the system may retrieve from a database, or receive from users of the system, information about the network deployments (e.g., a deployment project, a deployment date, a deployment type, a project creator, a deployment location, a carrier ID, an expected impact range, impacted tiles, a deployment priority), information related to network metrics (e.g., number of internet users, number of internet users experiencing faster network speed, network speed, latency, time spent, significance thresholds, filtering criteria,), and information related to measurement of network performance (e.g., an associated carrier, an incremental network metric, similarity thresholds, significance thresholds, a filtering criterion, a metric-methodology scheme, a methodology type, a time-window including the first time period before the network deployment and the second time period after the deployment, etc.). Then, the system may generate a network measurement project for measuring the network performance and the impact of the network deployment on the geographic region of interest connected by the communication network. The system may collect or access network performance data for a time window (e.g., 120 days) around the deployment (e.g., 60 days before the deployment and 60 days after the deployment). After that, the system may determine one or more incremental network metrics as specified by the user based on the collected or accessed network performance data. The system may compare the network metrics after the deployment to corresponding baselines to determine the incremental metrics (e.g., incremental number of internet users or incremental number of internet users experiencing faster network speed). The system may determine whether the impact of the deployment is significant based on a comparison of the incremental metrics (e.g., incremental number of internet users or incremental number of internet users experiencing faster network speed) and one or more significance thresholds. As last, the system may send, to the client system, instructions for presenting a visualization of the impact of the network deployment within the user interface. The visualization may include information describing at least a portion of the geographic region of interest and indications of the one or more incremental metrics of the communication network with respect to the described portion of the geographic region of interest. The system may display the measured impacts of the deployment (e.g., trends or changes of the incremental number of internet users or incremental number of internet users experiencing faster network speed) on the interactive UI to the user. The displayed measurement results may be customized or updated based by the user inputs received through the interactive UI.

Receive User Inputs

Figure 9A:
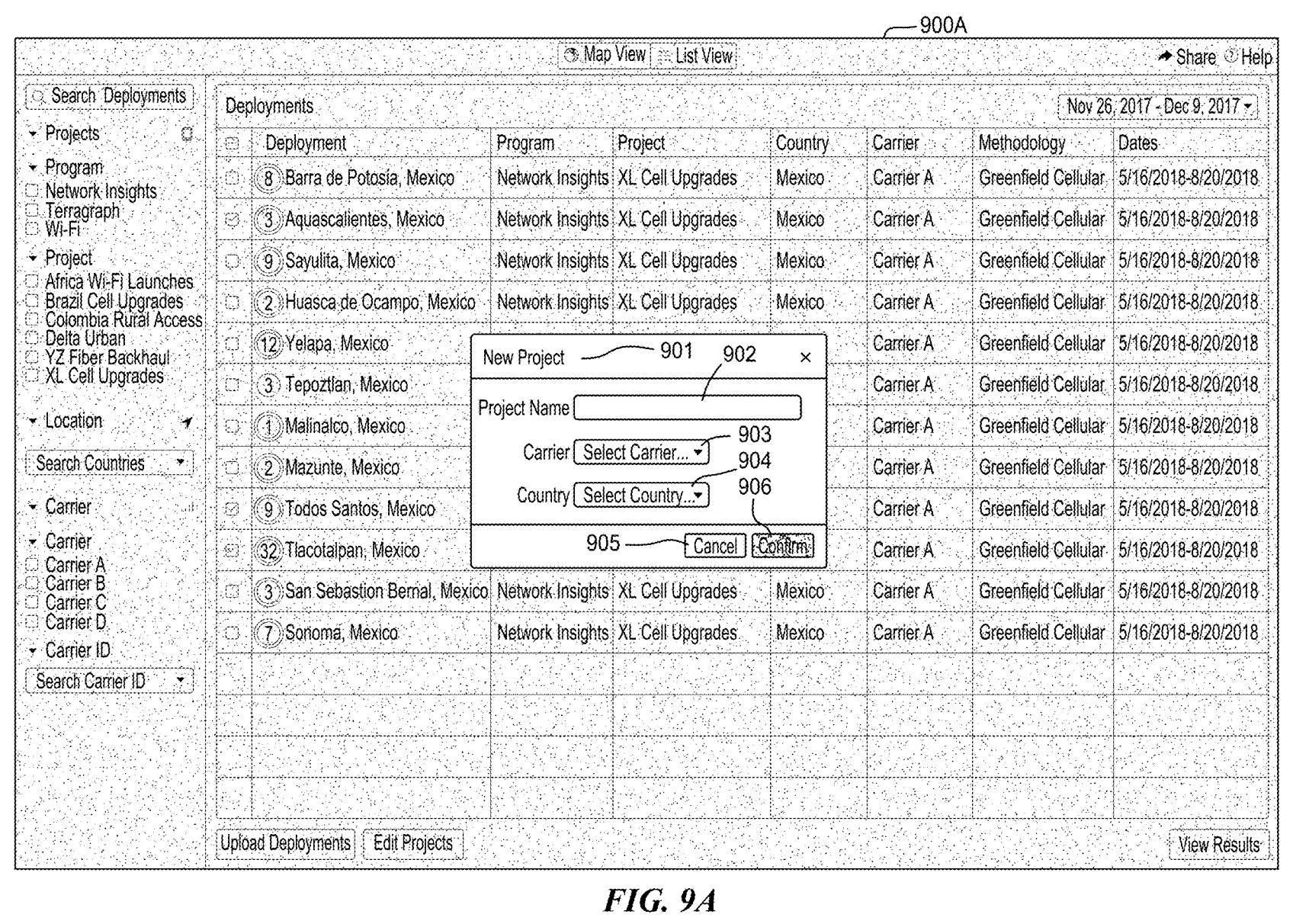

FIG. 9A illustrates an example interactive user interface (UI) 900A for receiving inputs from users for creating measurement project. As an example and not by way of limitation, the system may receive user inputs from a pop-out dialog box 901 for creating new measurement project. The dialog box 901 may include an input field 902 for users to type in project name, a drop-down menu 903 for users to select carrier, a drop-down menu 904 for users to select country, a button 905 to cancel the project creation, and a button 906 to confirm the project creation. In particular embodiments, the system may receive, via one or more interactive UIs, user inputs containing information about network deployments (e.g., a deployment project, a deployment date, a deployment type, a project creator, a deployment location, a carrier ID, an expected impact range, impacted tiles, a deployment priority), information about network metrics (e.g., number of internet users, number of internet users experiencing faster network speed, network speed, latency, time spent, significance thresholds, filtering criteria), information about time window (e.g., a time period before the deployment and a time period after the deployment) for measuring network deployment impact.

FIG. 9B illustrates an example interactive user interface (UI) 900B for receive inputs from users for editing measurement projects. As an example and not by way of limitation, the system may receive user inputs from a pop-out dialog box 911 for editing measurement projects. The dialog box 911 may include a table which includes a project name column 912 for users to edit the project names, a carrier name column 913 for user to edit or select carrier names, a country name column 914 for user to edit or select county, a edit-delete button column 915 for uses to edit or delete projects, a new project button 916 for user to create new project, a button 917 to for users to confirm the project editing. In particular embodiments, the system may allow user to edit or configure any properties or parameters associate with a measurement project.

List View

FIG. 9C illustrates an example interactive user interface (UI) 900C for displaying measurement projects in a list view and allowing users to configure the measurement projects in control panels. In particular embodiments, the system may provide an interactive UI which may allow users to create and configure the deployment projects whose impacts will be measured. In particular embodiments, the interactive UI may display the deployment projects in a list view or a map view based on the user's selection through the interactive UI. The interactive UI in the list view mode may display a number of deployments in a table (e.g., hive table). As an example and not by way of limitation, the interactive UI 900C may include a segmented button 921 to allow the users to switch between the map view and list view. The interactive UI 900C in the list view mode may include a table 930 for displaying the measurement projects. The table 930 may include a number rows and columns. Each row may include a deployment project while each column may correspond to an attribute associated with the deployments. For example, the deployment attributes may include, for example, a deployment name 931, an associated program 932 (e.g., Network Insights, Terragraph, Wi-Fi), an associated project 933 (e.g., cell upgrades, fiber backhaul, delta urban, rural access, cell updates, Wi-Fi launches), an associated region 934 (e.g., country, state, city, tile, zip code area), a carrier 935, a methodology 936, a time period 937 (e.g., a start date and an end date), etc. In particular embodiments, the interactive UI 900C may include a drop-down menu 938 which may allow user to select the time period to filter the displayed deployment projects in the table 930. The interactive UI 900C may include a selection button with check box mark (e.g., 940) for each row of the table 930 to allow the user to select the corresponding deployment project for editing or configuring operations.

Control Panels

In particular embodiments, the interactive UI 900C may include a number of control panels which may allow users to select parameter values or configuration options for deployment projects. For example, the control panel 923 may allow users to select deployment programs, such as, Network Insights, Terragraph, Wi-Fi, etc. As another example, the control panel 924 may allow users to select deployment projects, such as, Wi-Fi launches, cell upgrades, rural access, delta urban, fiber backhaul, etc. As another example, the control panel 925 allow the user to select a region (e.g., countries, cities, states/provinces, locations, impact radius, tiles, zip code areas) from a drop-down menu. As another example, the control panel 926 may allow users to select a carrier from either the list of carriers or a drop-down menu 927. In particular embodiments, the interactive UI 900C and may also include a search bar 922 for users to search all deployment projects. The interactive UI 900C may further include a button 928 for users to upload deployment data, a button 929 for users to edit projects, and a button 939 for users to view measurement results.

In particular embodiments, the control panels (e.g., 923, 924, 925, 926) and search bar (e.g., 922) may allow the user to select or input one or a combination of multiple deployment attribute values to filter the deployments displayed in the table. For example, the user may select "Network Insights" for the program attribute of the deployment. The table of the interactive UI 900C may filter out and display all deployments having "Network Insights" as the project attribute. As another example, the user may select "Wi-Fi" for program attribute and "Mexico" for location. The interactive UI 900C may filter out and display all deployments with program attribute of "Wi-Fi" and location attribute of "Mexico". The control panels may be displayed next to the table displaying the deployments in the interactive UI 900C. The interactive UI 900C may allow the user to filter the deployment according one or multiple deployment attributes as specified by the user. The interactive UI 900C may also allow the user to filter the deployment by time (e.g., a duration, a start date, an ending date). For example, the user may select or specify a time period (e.g., select from a drop-down menu 938 or a calendar). The interactive UI 900C may filter out and display the corresponding deployments based on the specified time period. In particular embodiments, the interactive UI 900C may allow the user to select one or more deployments from the table 930 to conduct the impact measurement and view the measurement results. For example, the user may select one or multiple deployments from the table 930 and click on the view result button 939 to view the measurement results. The system may start the process to measure the deployment impact and display the measurement results to the user. The measurement results may be updated to the user while the measurement is undergoing (e.g., collecting or accessing network performance data and calculating the incremental metrics) or/and after the measurement is completed.

Map View

Figure 9D:
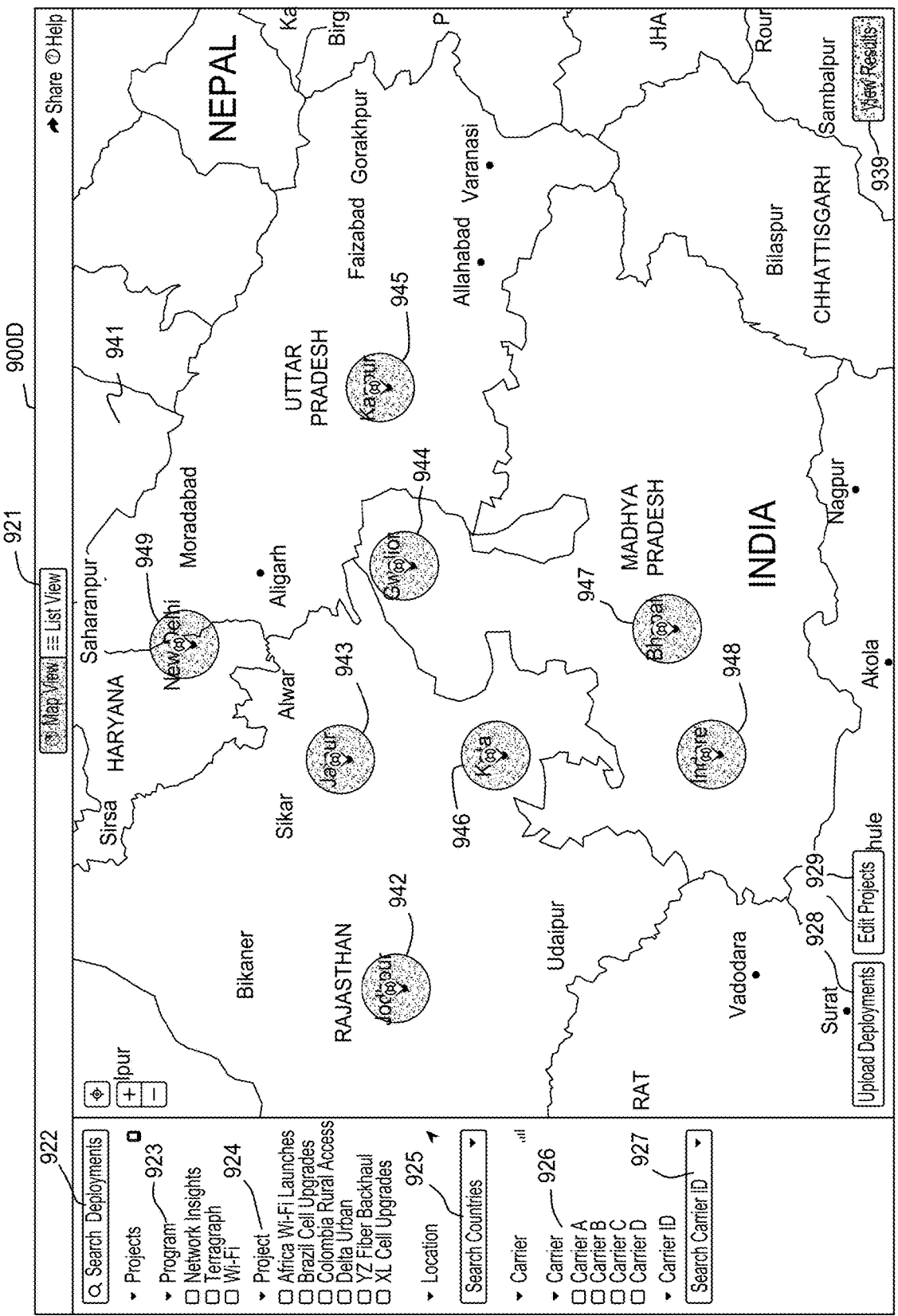
FIG. 9D illustrates an example interactive user interface (UI) for displaying deployment measurement projects in a map view.

FIG. 9D illustrates an example interactive user interface (UI) 900D for displaying deployment measurement projects in a map view. In particular embodiments, the interactive UI 900D may allow the user to select the list view mode or the map view mode for displaying the deployments. For example, the user may switch between the list view and the map view by clicking on the segmented button 921. When the user selects the map view mode, the interactive UI 900D may display the deployments on a map 941 covering the regions of the deployments. For example, the interactive UI 900C may display a number of deployment regions (e.g., 942, 943, 944, 945, 946, 947, 948, 949). Each deployment region may be represented by a circle area on the map with the center of that circle indicating the deployment location and the circle radius indicating the impact radius. Each circle area may include an icon or other visual information indicating deployment attribute information (e.g., deployment type). The interactive UI 900D may allow the user to zoom in-and-out the map for viewing a smaller or a larger area on the map. The interactive UI 900D may allow the user to select one or multiple deployments from the map to view more detailed information. The interactive UI 900D may include the search bar 922 and control panels (e.g., 923, 924, 925, 926, 927) for the map view in a way similar to the list view. The control panels may include the deployment attributes with possible options or values and allow the user to select one or more attribute options to filter or configure the map view display. The interactive UI 900D may include the buttons 928, 929 and 939 for users to upload deployment data, edit projects and view measurement results.

Figure 9E:
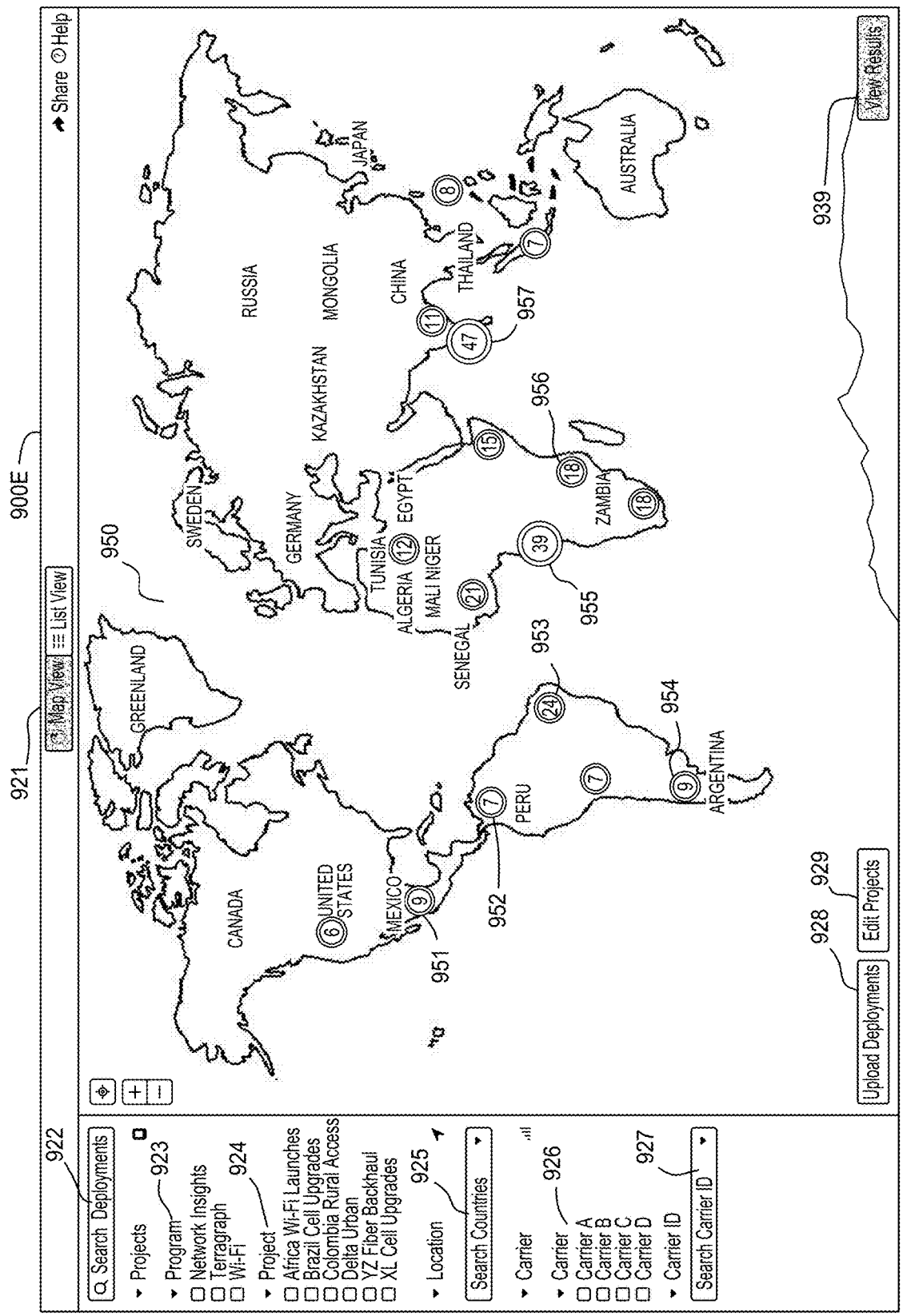
FIG. 9E illustrates another example interactive user interface (UI) for displaying deployment measurement projects in a map view.

FIG. 9E illustrates another example interactive user interface (UI) 900E for displaying deployment measurement projects in a map view. The map 905 in the interactive UI 900E may be in a zoom-out mode covering the whole world and display a number of deployment regions (e.g., 951, 952, 953, 954, 955, 956, 957). Each deployment region may be represented by a circle area. Each circle area may include deployment information (e.g., the number of impacted cell towers in the region) in the corresponding deployment region. In particular embodiments, the map view may include a tile layer which provide more detailed deployment information at tile level. The interactive UI 900E may include the buttons 928, 929 and 939 for users to upload deployment data, edit projects and view measurement results.

Figure 9F:
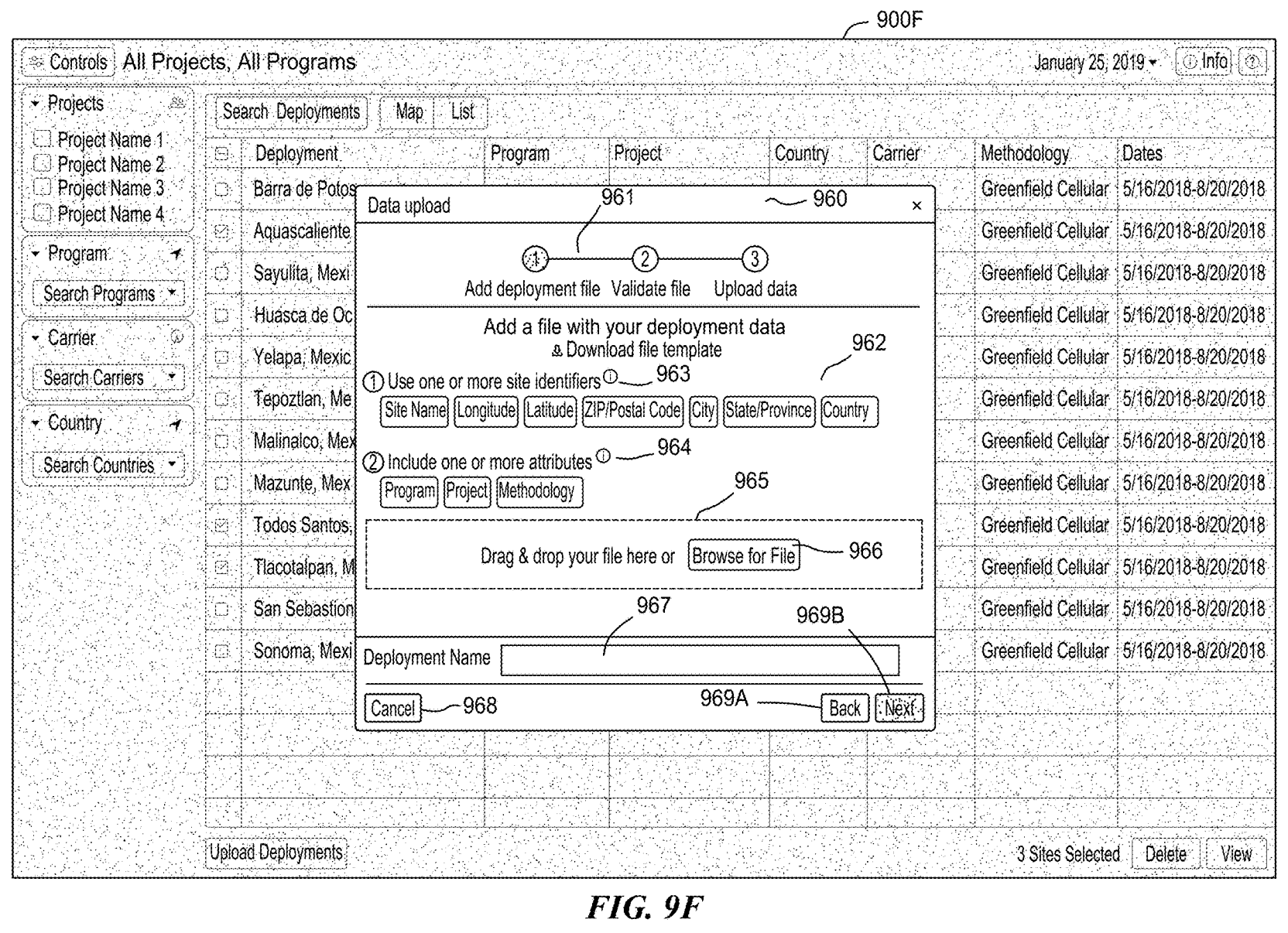

FIG. 9F illustrates an example interactive user interface (UI) 900F for users to upload deployment data file. In particular embodiments, the interactive UIs may allow users to input or edit deployment information through manual type-in or selection via the interactive UIs. For example, the interactive UIs may use a pop-out dialog box to allow user to input or edit information (e.g., project, region, carrier) of one or more deployment projects. In particular embodiments, the interactive UIs may allow the user to prepare or/and upload deployment files which contain deployment data. As an example and not by way of limitation, the interactive UI 900F may include a pop-out dialog box 960 for user to upload deployment data. The interactive UI 900F may include a status indicator 961 indicating the status of each step of the uploading process. The status indicator 961 may display a series of steps for uploading the deployment file including, for example, adding deployment file, validating file, uploading data, etc. The interactive UI 900F may include an operation panel 962 displaying related information (e.g., site identifiers 963, attributes 964) to users for adding files including deployment data. The interactive UI 900F may allow the user to prepare and upload files with a variety of site identifiers 963 (e.g., site name, longitude, latitude, zip code/Postal code, city, state/province, country, etc.) and a variety of attributes 964 (e.g., program, project, methodology, etc.). The interactive UI 900E may include a drag-and-drop region 965 which may allow users to drag and drop deployment files into that region for uploading operation. The interactive UI 900E may allow users to upload files containing deployment data through a browsing button 966. The interactive UI 900E may allow users to specify the deployment name through a text filed 967. The interactive UI 900E may allow users to proceed to next step of file uploading process by clicking on the button 969B or to come back to a former step of the uploading process through the button 959A or to cancel the file uploading operation through a cancel button 968.

Measurement Result Summary

Figure 9G:
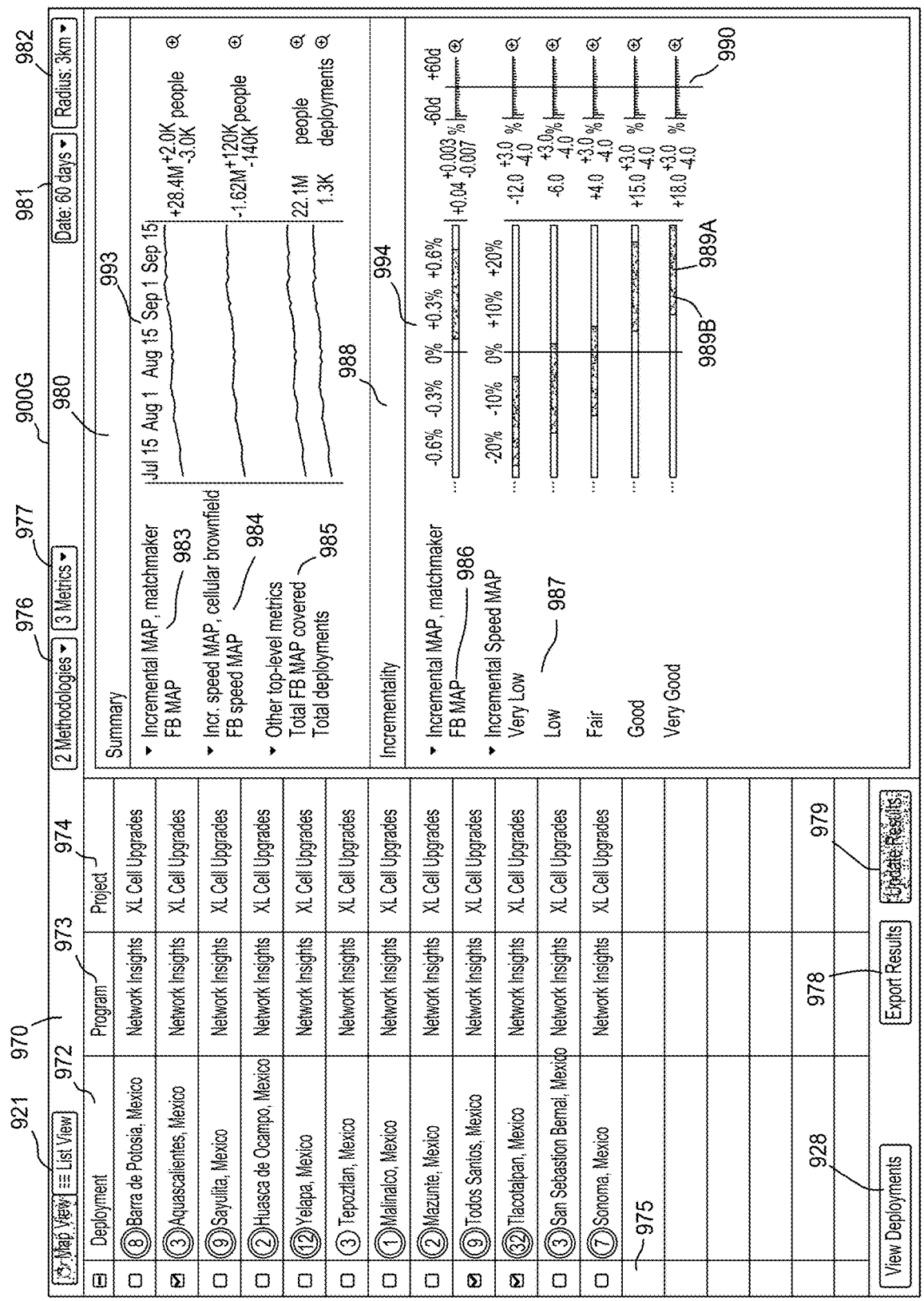
FIG. 9G illustrates an example interactive user interface (UI) for displaying measurement result summaries based on user's selection and configuration.

FIG. 9G illustrates an example interactive user interface (UI) 900G for displaying measurement result summaries based on user's selection and configuration. In particular embodiments, the system may measure the deployment impact of one or more regions of interest and visualize measurement results in the interactive UIs based on the user's selection or configuration. As an example and not by way of limitation, the interactive UI 900G may display a table 970 which includes a list of deployments. The table 970 may allow the user to select one or more deployments to view the measurement results. Once the user selects particular deployments, the interactive UI 900G may display a measurement result summary 980 and the incrementality summary 988 next to the table 970 in the interactive UI 900G. The measurement result summary 980 may include one or more charts (e.g., 993) displaying the trends of one or more network metrics over a period of time before and after the deployments and one more text summaries (e.g., 983, 984, 985) for displaying information related to network metrics (e.g., number of internet users, number of internet users experiencing faster network speed) and measurement methodologies (e.g., causal inference methods including synthetic controls, hold-out experiment, growth accounting method, etc.). The incrementality summary 988 may include a percentage bar chart 994 in a delta view mode showing the changes of the incremental metrics after the deployment. The bar chart 944 may display the improvement of incremental number of internet users experiencing faster network speed over a set of speed buckets (e.g., Very Low, Low, Fair, Good, Very Good) and may display the improvement of the overall incremental number of internet users. Each metric bar in the bar chart 944 may include a center point indicating the measured value of the corresponding metric (e.g., 989A indicating the value incremental number of internet users experiencing faster network speed for Very Good speed bucket) and the bar (e.g., 989B) may indicate the error range or confidence interval) of the measured metric value. In particular embodiments, the interactive UI 900G may display the measured incremental metrics in a delta time series view. In particular embodiments, the system may display metric bar char in the delta time series view mode in which the metric bars may be displayed as a series over time to show the changes or trends of the metric over time. The length of the metric bar may indicate the error range or confidence interval and the center point of the metric bar may indicate the measured metric value.

Figure 9H:
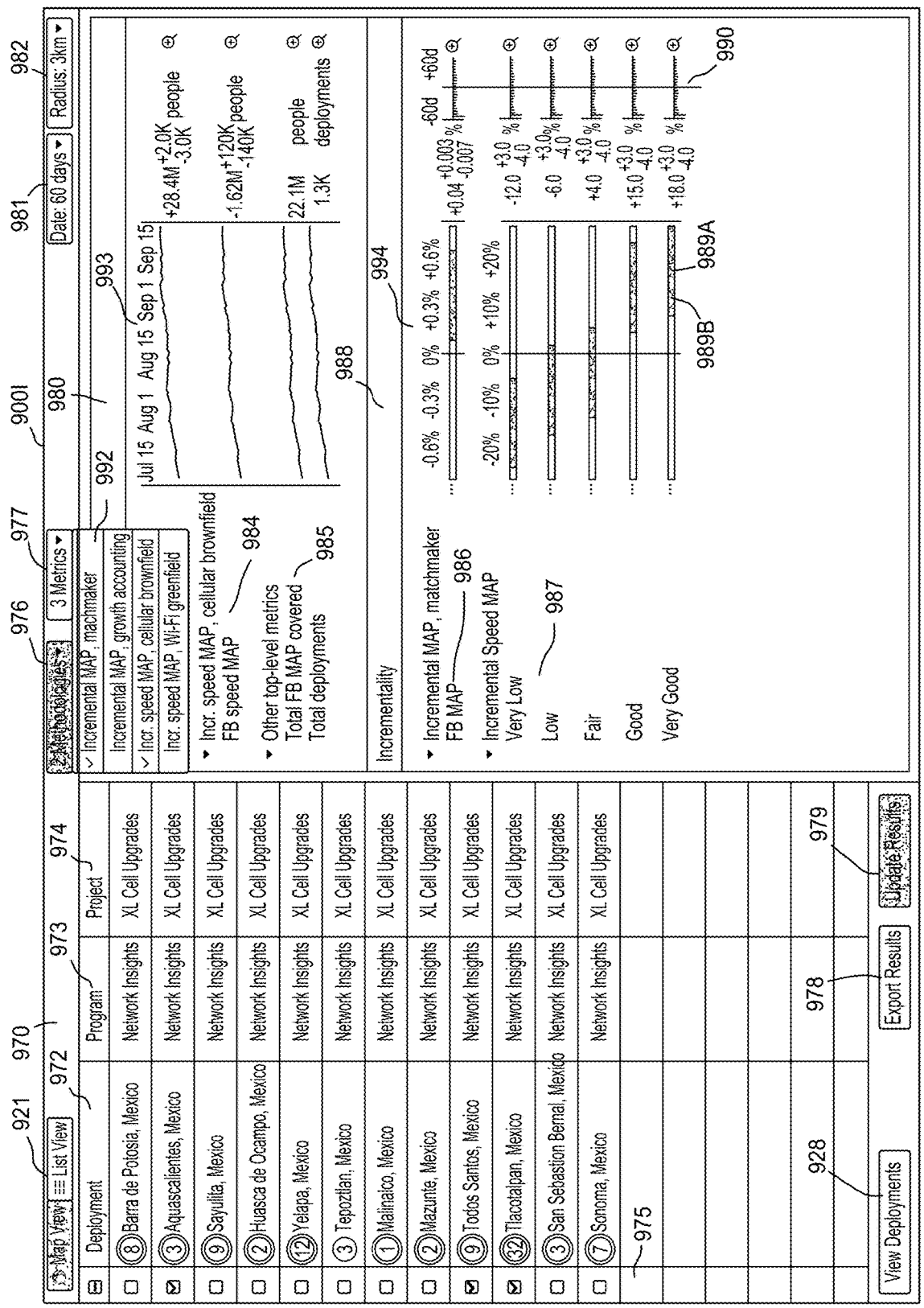
FIG. 9H illustrates an example interactive user interface (UI) for configuring the metric-methodology scheme used for the measurement and displayed in the measurement results.

FIG. 9H illustrates an example interactive user interface (UI) 900H for configuring the metric-methodology scheme used for the measurement and displayed in the measurement results. In particular embodiments, the interactive UIs may allow the user to specify which network metrics and which methodologies will be used for a particular measurement and will be displayed the measurement results summary. As an example and not by way of limitation, the interactive UI 900H may allow the user to select one or multiple network metrics and one or more methodologies from a drop-down menu 976. The user may select one or more metric-methodology schemes from the multiple options displayed on the displayed drop-down menu 992. Once the network metrics and methodologies are selected, the interactive UI 900H may display or update the visualized measurement results based on the user's selection or configuration. For example, the user may select "Incremental MAP, growth accounting" and "Incremental speed MAP, cellular brownfield" methods as the methodologies for a particular measurement. The system may process the network performance data and determine the impact measurement results based on the user's selections. The interactive UI 900H may display or update the measurement summary and the incrementality summary correspondingly. The measurement summary may display the currently used network metrics and methodologies in addition to the network metric chart.

Figure 9I:
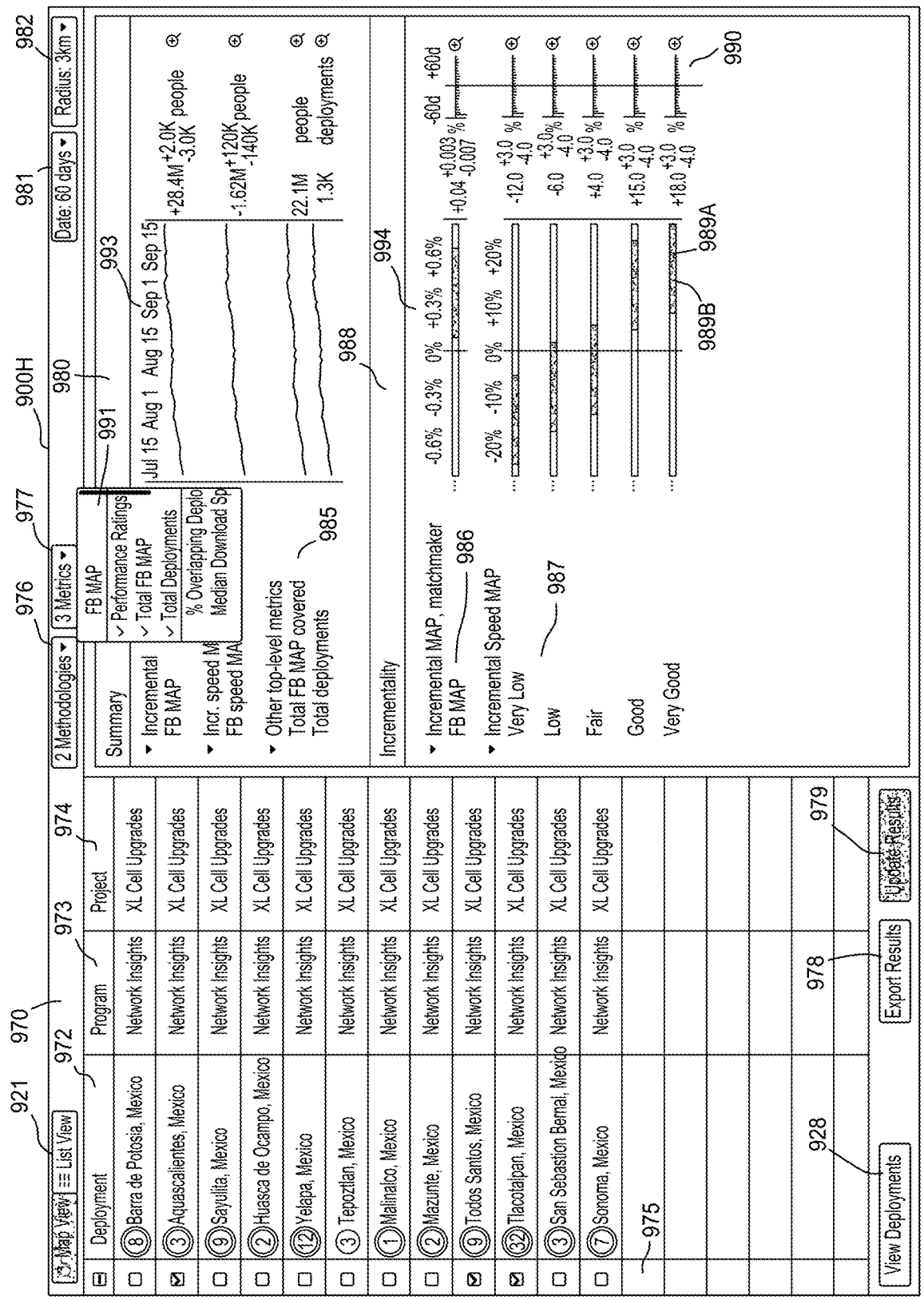
FIG. 9I illustrates an example interactive user interface (UI) for configuring the network metrics used for the measurement and displayed in the measurement results.

FIG. 9I illustrates an example interactive user interface (UI) 900I for configuring the network metrics used for the measurement and displayed in the measurement results. In particular embodiments, the interactive UIs may allow the user to specify which network metrics will be used for a particular measurement and will be displayed the measurement results. As an example and not by way of limitation, the interactive UI 900I may allow the user to select one or more network metrics from a drop-down menu 977. The user may select one or more metrics in from the multiple options on the displayed drop-down menu 991. For example, the user may select three network metrics including performance ratings, total MAP and total deployments as the network metrics for a particular deployment project. Once the network metrics are selected, the interactive UI 900I may display or update the displayed measurement results based on the user's selection or configuration.

Furthermore, the interactive UIs may allow the user to set up the length of the time window (e.g., 60 days before and after deployment) and the impact radius for measuring the network performance. As an example and not by way of limitation, the interactive UI 900I may allow the user to set up the time window for measuring the network performance through the drop-down menu 981. Once the user selects or changes the time window, the system may generate the measurement results based on the user's selection or configuration. The interactive UI 900I may display or update the measurement results accordingly. As an example and not by way of limitation, the interactive UI 900I may allow the user to set up the impacted range (e.g., 3 km impacted radius) for measuring the network performance through the drop-down menu 981. Once the user selects or changes the impacted range, the system may generate the measurement results based on the user's selection or configuration. The interactive UI 900I may display or update the measurement results accordingly.

Detail View Chart

Figure 9J:
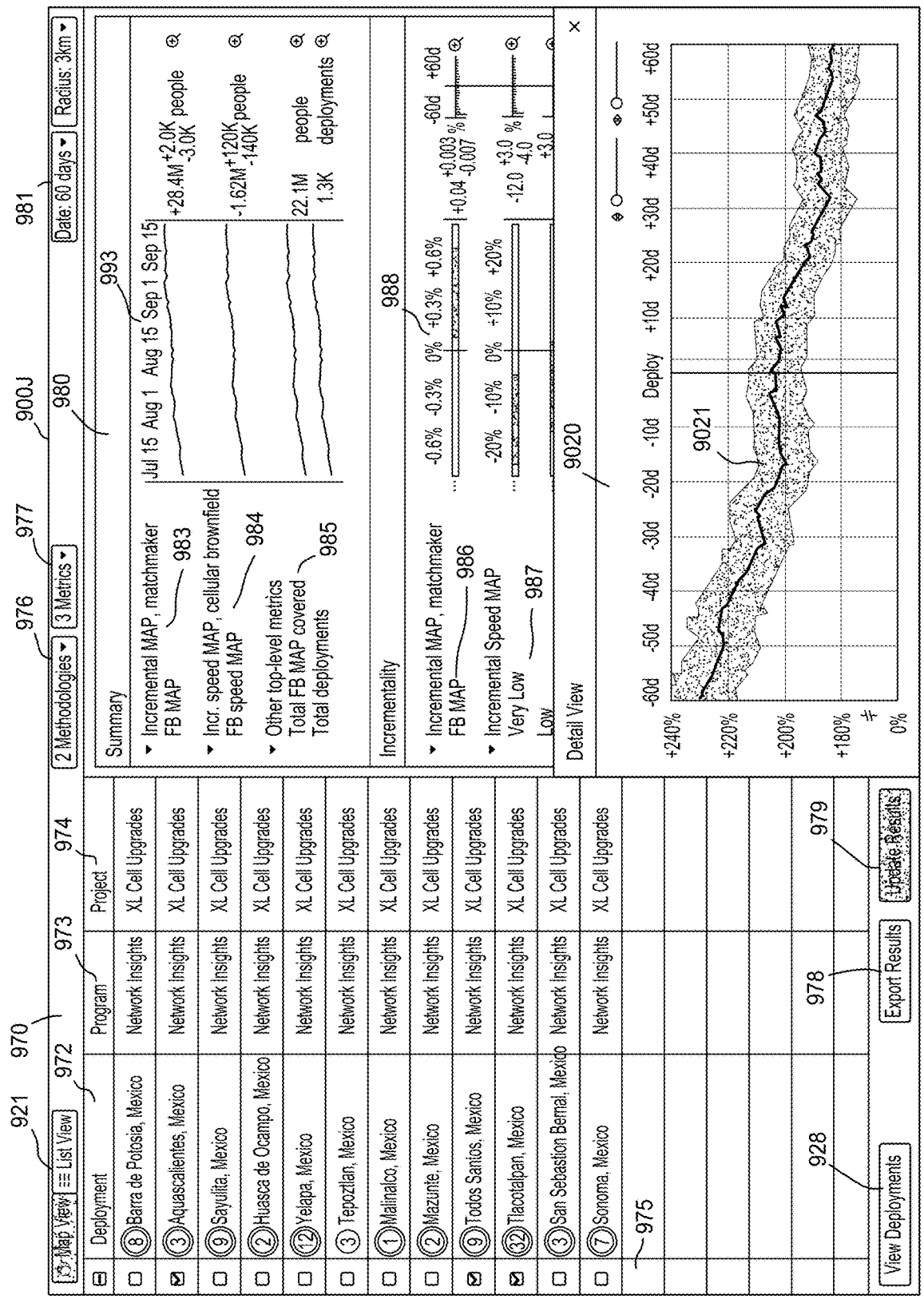
FIG. 9J illustrates an example interactive user interface (UI) for a detailed view of an incremental metric displayed in the measurement results.

FIG. 9J illustrates an example interactive user interface (UI) 900J for a detailed view of an incremental metric displayed in the measurement results. In particular embodiments, the interactive UIs may display a detail view chart of one or more incremental metrics as specified by the user through the interactive UIs. As an example and not by way of limitation, the UI 900J may display a detail view 9020 showing the changes and trends of an incremental network metric 9021 (e.g., incremental number of internet users, incremental number of internet users experiencing faster network speed) with the corresponding confidence interval for a 60-day time period before the deployment and a 60-day time period after the deployment.

Figure 9K:
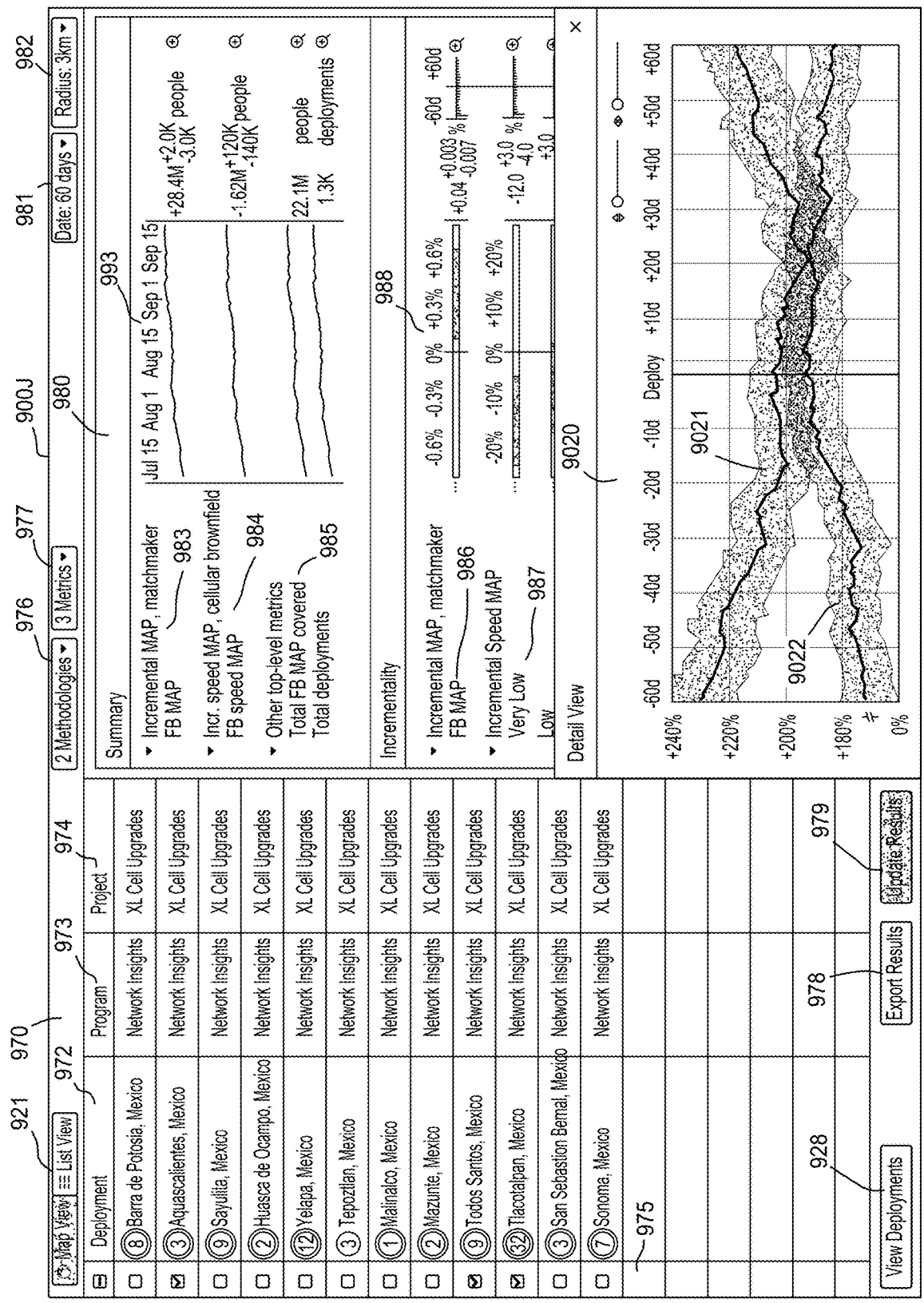
FIG. 9K illustrates an example interactive user interface (UI) for a detailed view of multiple incremental metrics displayed in the measurement results.

FIG. 9K illustrates an example interactive user interface (UI) 900J for a detailed view of multiple incremental metrics displayed in the measurement results. In particular embodiments, the interactive UIs may display a detail view chart of multiple incremental metrics as specified by the user through the interactive UIs. As an example and not by way of limitation, the UI 900K may display a detail view 9020 showing the changes and trends of a first incremental metric 9021 (e.g., incremental number of internet users, incremental number of internet users experiencing faster network speed) and a second incremental metric 9022 (e.g., incremental number of internet users, incremental number of internet users experiencing faster network speed). The first and second incremental metrics may be associated with a 60-day time period before the deployment and a 60-day time period after the deployment. In particular embodiments, the network metrics in the detail view chart 9020 may each be marked using a different color. The curve of each network metric may be displayed with the confidence interval (e.g., top limit curve and bottom limit curve). The interactive UI 900K may allow the user to configure and customize the detail view by selecting network metrics to be displayed, changing displayed value range, or changing the displayed time window. The detail view chart 9020 may allow the user to have an intuitive understanding on the network metric trends and the impacts of the corresponding deployments. In addition, the interactive UI 900K may allow the user to export the measurement results to external files and allow user the manually update the measurement result after the selection or configuration made by the user.

Figure 9L:
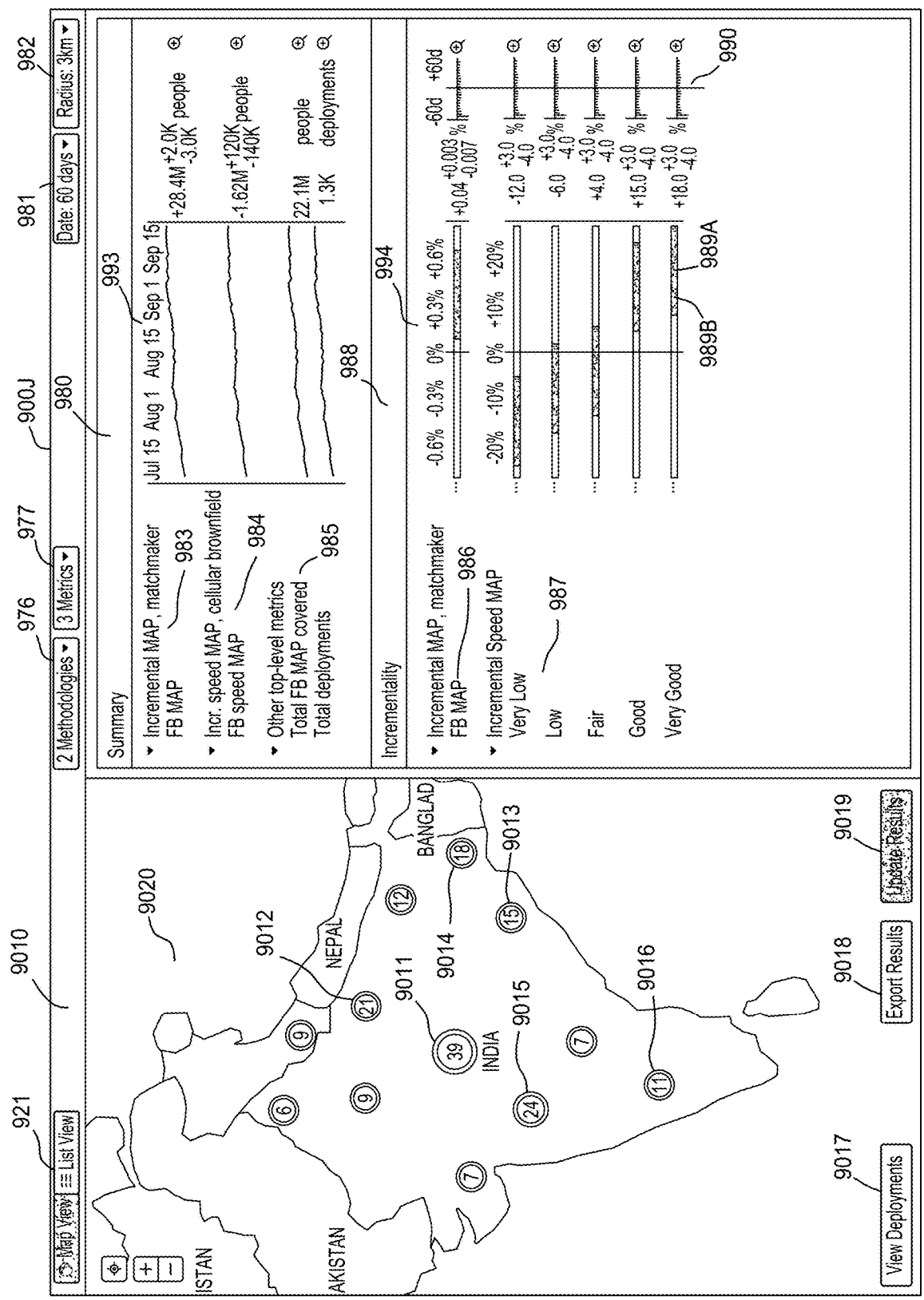
FIG. 9L illustrates an example interactive user interface (UI) for displaying the deployment projects in a map view and the measurement result summaries.

FIG. 9L illustrates an example interactive user interface (UI) for displaying the deployment projects in a map view and the measurement result summaries. In particular embodiments, the system may allow the user to select the view mode (e.g., map view or list view) for displaying the deployments while displaying the measurement results on the side. As an example and not by way of limitation, the user may select (e.g., by clicking on the segmented button 921) to display the deployments in a map view 9010 while displaying the measurement summary 980 and incrementality summary 988 next to the map. The map view 9010 may display a number of deployment regions (e.g., 9011, 9012, 9013, 9014, 9015, 9016) in a map 9020. The map view 9010 may allow the user to zoom or move the map 9020 and select or deselect deployments to view the corresponding measurement results.

Example Method

Figure 10:
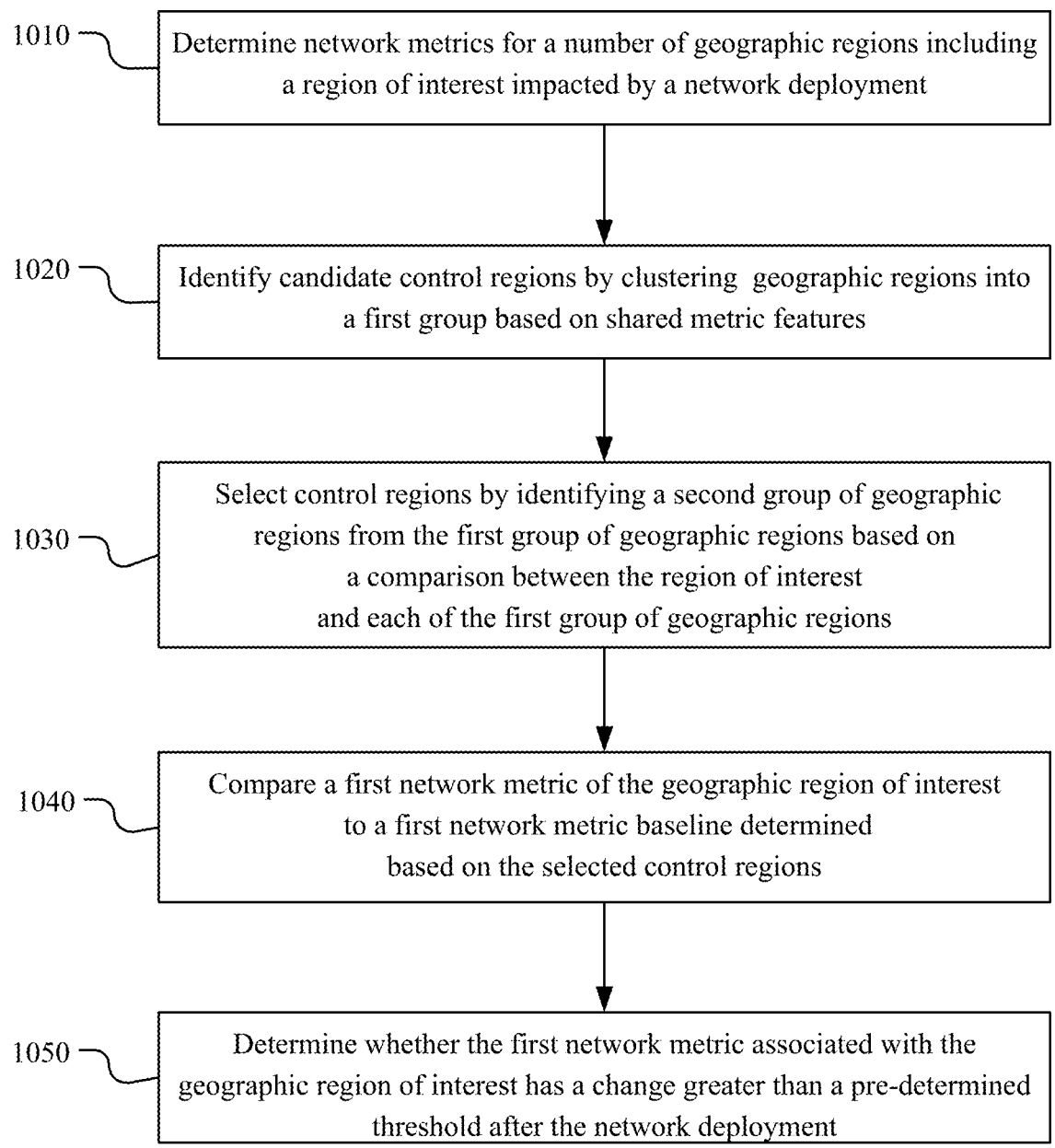
FIG. 10 illustrates an example method of measuring network deployment impacts on a geographic region of interest.

FIG. 10 illustrates an example method of measuring network deployment impacts on a geographic region of interest. The method may begin at step 1010, where in the system may determine one or more network metrics for a number of geographic regions connected by a communication network. The geographic regions may include a geographic region of interest which is impacted by a network deployment. In particular embodiments, the one or more network metrics may include, for example, but are not limited to, a monthly active people metric, a network speed metric, a network latency metric, a time spent metric, etc. In particular embodiments, the geographic region of interest and other geographic regions may be a region of any size or scale including, for example, but not limited to, countries, cities, states/provinces, tiles, zip code areas, kilometer level regions, etc. In particular embodiments, the network metrics may be determined based on network performance data collected during a first time period (e.g., 60 days) before the network deployment and a second time period (e.g., 60 days) after the network deployment.

At step 1020, the system may identify a set of candidate control regions by clustering the geographic regions into one or more candidate control region groups based on similarity between the geographic regions. For example, the geographic regions in each group may share one or more common metric features including, for example, but not limited to, a metric trend, a metric value, a metric range, a metric changing slope, a metric error level, a metric change, a metric confidence level, etc. Each group of geographic regions may be a category of candidate control regions from which the qualified control regions will be identified. The system may cluster the geographic regions into candidate control region groups to narrow down the scope for identifying the qualified control regions. The metric features shared by the candidate control regions in each group may be determined based on at least one network metric determined based on the network performance data collected during the first time period before the network deployment.

At step 1030, the system may select one or more control regions from the set of candidate control regions by identifying a second group of geographic regions as the qualified control regions from a group of candidate control regions. The qualified control regions may be identified based on a comparison between the region of interest and each of the candidate control region of a group of candidate control region. The system may compare a metric feature shared by the geographic region of interest and a candidate control region and may determine that candidate control region as a qualified control region when the similarity of that shared network feature is above a similarity threshold or a qualification threshold. The shared metric feature for determining the similarity may be determined based on network performance data collected before the network deployment. The qualified control regions may be used by a synthetic controls method to determine the network metric baseline. In particular embodiments, the system may cluster the candidate control regions and identify the qualified control regions using a machine-learning model.

At step 1040, the system may compare a first network metric associated with the geographic region of interest to a first network metric baseline. The system may determine the first network metric baseline based on a weighted combination of one or more of the selected control regions. The baseline may be determined based on the network performance data associated with the selected control regions and collected after the network deployment. The system may assume the network metric or network metric trends of the impacted regions may be approximated by the baseline determined based on qualified control regions if the network deployment is not taken. In particular embodiments, the system may use the hold-out regions from long term hold-out experiments as the candidate control regions. The hold-out regions may be regions excluded from being impacted by the network deployment. In particular embodiments, the selected control regions for determining the network metric baseline may be randomly selected from hold-out regions.

At step 1050, the system may determine whether the first network metric associated with the geographic region of interest has a change greater than a first predetermined threshold after the network deployment. The first predetermined threshold may be determined by a machine-learning model. In particular embodiments, the system may further compare a second network metric of the geographic of interest after the network deployment to a second network metric baseline. The second network baseline may be determined based on network performance data of the geographic of interest before the network deployment. The system may determine whether the second network metric of the geographic region of interest has a change greater than a second pre-determined threshold after the network deployment. The second network metric may include one or more of, for example, but is not limited to, a churned user number, a user churning rate, a new user number, a resurrected user number, etc.

In particular embodiments, the system may further determine a first distribution of a network metric of the geographic region of interest over a set of network metric buckets before the network deployment. The system may determine a second distribution of the same network metric of the geographic region of interest over the set of network metric buckets after the network deployment. The system may compare the first distribution and second distribution of the third network metric to determine whether the third network metric has a change greater than a third predetermined threshold after the network deployment. The system may determine the network metric using a carrier-specific method, a carrier-agnostic method or a user-based method. In particular embodiments, the system may aggregate one or more network metrics across two or more carriers impacted by the deployment and determine whether the one or more network metrics have changes greater than respective pre-determined thresholds over the two or more carriers after the deployment. In particular embodiments, the system may further determine a cause-effect correlation between the change of a network metric and a network deployment when the change of the first network metric is greater than the corresponding pre-determined threshold.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for measuring network deployment impacts of a geographic region of interest including the particular steps of the method of FIG. 10, this disclosure contemplates any suitable method for measuring network deployment impacts of a geographic region of interest including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

System Overview

Figure 11:
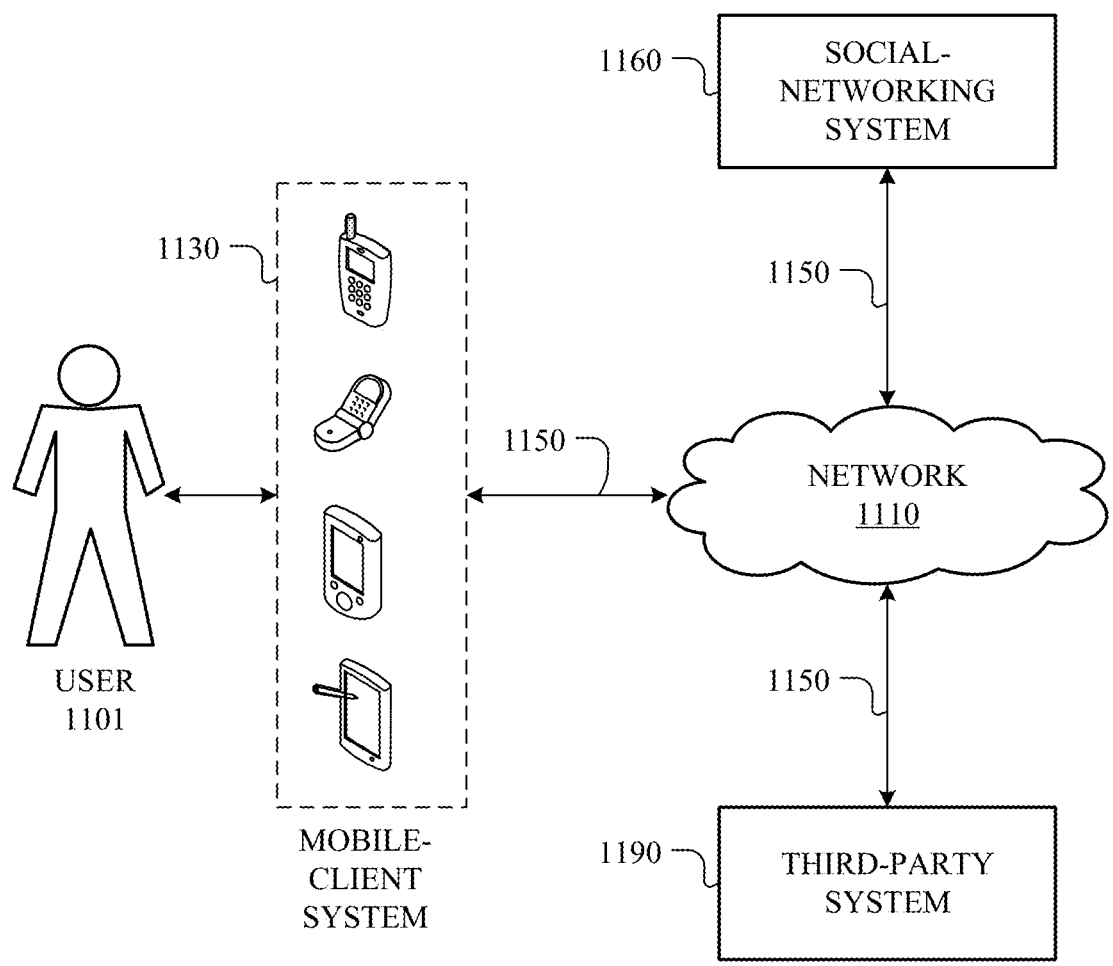
FIG. 11 illustrates an example network environment associated with a social-networking system.

FIG. 11 illustrates an example network environment 1100 associated with a social-networking system. Network environment 1100 includes a client system 1130, a social-networking system 1160, and a third-party system 1170 connected to each other by a network 1110. Although FIG. 11 illustrates a particular arrangement of client system 1130, social-networking system 1160, third-party system 1170, and network 1110, this disclosure contemplates any suitable arrangement of client system 1130, social-networking system 1160, third-party system 1170, and network 1110. As an example and not by way of limitation, two or more of client system 1130, social-networking system 1160, and third-party system 1170 may be connected to each other directly, bypassing network 1110. As another example, two or more of client system 1130, social-networking system 1160, and third-party system 1170 may be physically or logically co-located with each other in whole or in part. Moreover, although FIG. 11 illustrates a particular number of client systems 1130, social-networking systems 1160, third-party systems 1170, and networks 1110, this disclosure contemplates any suitable number of client systems 1130, social-networking systems 1160, third-party systems 1170, and networks 1110. As an example and not by way of limitation, network environment 1100 may include multiple client system 1130, social-networking systems 1160, third-party systems 1170, and networks 1110.

This disclosure contemplates any suitable network 1110. As an example and not by way of limitation, one or more portions of network 1110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1110 may include one or more networks 1110.

Links 1150 may connect client system 1130, social-networking system 1160, and third-party system 1170 to communication network 1110 or to each other. This disclosure contemplates any suitable links 1150. In particular embodiments, one or more links 1150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1150, or a combination of two or more such links 1150. Links 1150 need not necessarily be the same throughout network environment 1100. One or more first links 1150 may differ in one or more respects from one or more second links 1150.

In particular embodiments, client system 1130 may be an electronic device including hardware, software, or embedded logic components or a combination of two or more such components and capable of carrying out the appropriate functionalities implemented or supported by client system 1130. As an example and not by way of limitation, a client system 1130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1130. A client system 1130 may enable a network user at client system 1130 to access network 1110. A client system 1130 may enable its user to communicate with other users at other client systems 1130.

In particular embodiments, client system 1130 may include a web browser 1132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1130 may enter a Uniform Resource Locator (URL) or other address directing the web browser 1132 to a particular server (such as server 1162, or a server associated with a third-party system 1170), and the web browser 1132 may generate a Hyper Text Transfer Protocol (HTTP) request and communicate the HTTP request to server. The server may accept the HTTP request and communicate to client system 1130 one or more Hyper Text Markup Language (HTML) files responsive to the HTTP request. Client system 1130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1160 may be a network-addressable computing system that can host an online social network. Social-networking system 1160 may generate, store, receive, and send social-networking data, such as, for example, user-profile data, concept-profile data, social-graph information, or other suitable data related to the online social network. Social-networking system 1160 may be accessed by the other components of network environment 1100 either directly or via network 1110. As an example and not by way of limitation, client system 1130 may access social-networking system 1160 using a web browser 1132, or a native application associated with social-networking system 1160 (e.g., a mobile social-networking application, a messaging application, another suitable application, or any combination thereof) either directly or via network 1110. In particular embodiments, social-networking system 1160 may include one or more servers 1162. Each server 1162 may be a unitary server or a distributed server spanning multiple computers or multiple datacenters. Servers 1162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1162 may include hardware, software, or embedded logic components or a combination of two or more such components for carrying out the appropriate functionalities implemented or supported by server 1162. In particular embodiments, social-networking system 1160 may include one or more data stores 1164. Data stores 1164 may be used to store various types of information. In particular embodiments, the information stored in data stores 1164 may be organized according to specific data structures. In particular embodiments, each data store 1164 may be a relational, columnar, correlation, or other suitable database. Although this disclosure describes or illustrates particular types of databases, this disclosure contemplates any suitable types of databases. Particular embodiments may provide interfaces that enable a client system 1130, a social-networking system 1160, or a third-party system 1170 to manage, retrieve, modify, add, or delete, the information stored in data store 1164.

In particular embodiments, social-networking system 1160 may store one or more social graphs in one or more data stores 1164. In particular embodiments, a social graph may include multiple nodes—which may include multiple user nodes (each corresponding to a particular user) or multiple concept nodes (each corresponding to a particular concept)—and multiple edges connecting the nodes. Social-networking system 1160 may provide users of the online social network the ability to communicate and interact with other users. In particular embodiments, users may join the online social network via social-networking system 1160 and then add connections (e.g., relationships) to a number of other users of social-networking system 1160 to whom they want to be connected. Herein, the term "friend" may refer to any other user of social-networking system 1160 with whom a user has formed a connection, association, or relationship via social-networking system 1160.

In particular embodiments, social-networking system 1160 may provide users with the ability to take actions on various types of items or objects, supported by social-networking system 1160. As an example and not by way of limitation, the items and objects may include groups or social networks to which users of social-networking system 1160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1160 or by an external system of third-party system 1170, which is separate from social-networking system 1160 and coupled to social-networking system 1160 via a network 1110.

In particular embodiments, social-networking system 1160 may be capable of linking a variety of entities. As an example and not by way of limitation, social-networking system 1160 may enable users to interact with each other as well as receive content from third-party systems 1170 or other entities, or to allow users to interact with these entities through an application programming interfaces (API) or other communication channels.

In particular embodiments, a third-party system 1170 may include one or more types of servers, one or more data stores, one or more interfaces, including but not limited to APIs, one or more web services, one or more content sources, one or more networks, or any other suitable components, e.g., that servers may communicate with. A third-party system 1170 may be operated by a different entity from an entity operating social-networking system 1160. In particular embodiments, however, social-networking system 1160 and third-party systems 1170 may operate in conjunction with each other to provide social-networking services to users of social-networking system 1160 or third-party systems 1170. In this sense, social-networking system 1160 may provide a platform, or backbone, which other systems, such as third-party systems 1170, may use to provide social-networking services and functionality to users across the Internet.

In particular embodiments, a third-party system 1170 may include a third-party content object provider. A third-party content object provider may include one or more sources of content objects, which may be communicated to a client system 1130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1160 also includes user-generated content objects, which may enhance a user's interactions with social-networking system 1160. User-generated content may include anything a user can add, upload, send, or "post" to social-networking system 1160. As an example and not by way of limitation, a user communicates posts to social-networking system 1160 from a client system 1130. Posts may include data such as status updates or other textual data, location information, photos, videos, links, music or other similar data or media. Content may also be added to social-networking system 1160 by a third-party through a "communication channel," such as a newsfeed or stream.

In particular embodiments, social-networking system 1160 may include a variety of servers, sub-systems, programs, modules, logs, and data stores. In particular embodiments, social-networking system 1160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1160 may also include suitable components such as network interfaces, security mechanisms, load balancers, failover servers, management-and-network-operations consoles, other suitable components, or any suitable combination thereof. In particular embodiments, social-networking system 1160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1160 to one or more client systems 1130 or one or more third-party system 1170 via network 1110. The web server may include a mail server or other messaging functionality for receiving and routing messages between social-networking system 1160 and one or more client systems 1130. An API-request server may allow a third-party system 1170 to access information from social-networking system 1160 by calling one or more APIs. An action logger may be used to receive communications from a web server about a user's actions on or off social-networking system 1160. In conjunction with the action log, a third-party-content-object log may be maintained of user exposures to third-party-content objects. A notification controller may provide information regarding content objects to a client system 1130. Information may be pushed to a client system 1130 as notifications, or information may be pulled from client system 1130 responsive to a request received from client system 1130. Authorization servers may be used to enforce one or more privacy settings of the users of social-networking system 1160. A privacy setting of a user determines how particular information associated with a user can be shared. The authorization server may allow users to opt in to or opt out of having their actions logged by social-networking system 1160 or shared with other systems (e.g., third-party system 1170), such as, for example, by setting appropriate privacy settings. Third-party-content-object stores may be used to store content objects received from third parties, such as a third-party system 1170. Location stores may be used for storing location information received from client systems 1130 associated with users. Advertisement-pricing modules may combine social information, the current time, location information, or other suitable information to provide relevant advertisements, in the form of notifications, to a user.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social-networking system 1160 or shared with other systems (e.g., third-party system 1170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 1162 may be authorization/privacy servers for enforcing privacy settings. In response to a request from a user (or other entity) for a particular object stored in a data store 1164, social-networking system 1160 may send a request to the data store 1164 for the object. The request may identify the user associated with the request and may only be sent to the user (or a client system 1130 of the user) if the authorization server determines that the user is authorized to access the object based on the privacy settings associated with the object. If the requesting user is not authorized to access the object, the authorization server may prevent the requested object from being retrieved from the data store 1164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 12:
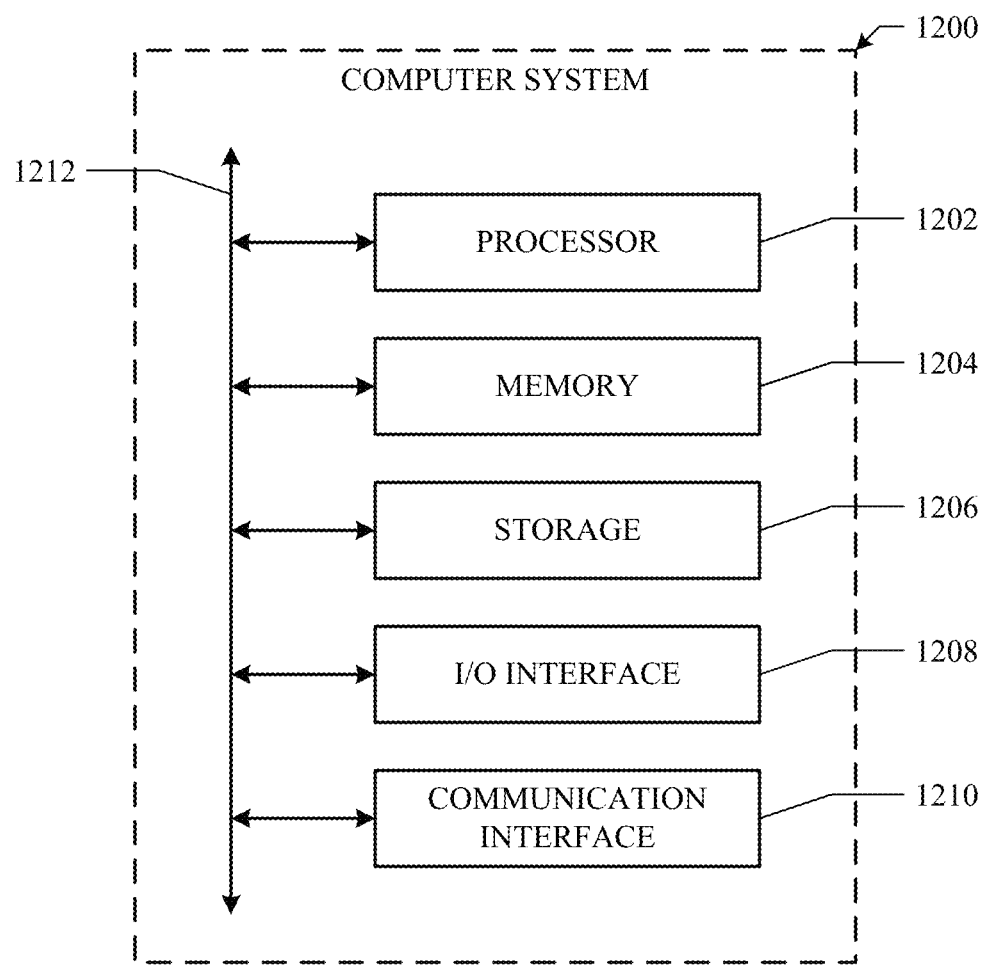
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   determining one or more network metrics for a plurality of geographic regions connected by a communication network, wherein the plurality of geographic regions comprise a geographic region of interest impacted by a network deployment;
   identifying a set of candidate control regions by clustering two or more geographic regions of the plurality of geographic regions into a first group of geographic regions based on at least one metric feature of at least one network metric shared by the two or more geographic regions, wherein each metric feature measures a change in the value of the corresponding network metric during a particular time period;
   selecting one or more control regions from the set of candidate control regions by identifying a second group of geographic regions from the first group of geographic regions based on a comparison between the region of interest and each of the first group of geographic regions;
   comparing a first network metric associated with the geographic region of interest to a first network metric baseline, wherein the first network metric baseline is determined based on the one or more control regions; and
   determining whether the first network metric associated with the geographic region of interest has a change greater than a first pre-determined threshold after the network deployment.

2. The method of claim 1, wherein the one or more network metrics are determined based on network performance data collected during a first time period before the network deployment and a second time period after the network deployment.

3. The method of claim 2, wherein the at least one metric feature shared by the first group of geographic regions is determined based on the network performance data collected during the first time period before the network deployment.

4. The method of claim 3, wherein each of the second group of geographic regions and the geographic region of interest have a similarity being above a similarity threshold, and wherein the similarity is determined based on one or more metric features associated with the geographic region of interest and that geographic region before the network deployment.

5. The method of claim 2, wherein the first network metric baseline is determined based on a weighted combination of the selected one or more control regions.

6. The method of claim 5, wherein the second group of geographic regions are identified by a machine-learning model, and wherein the selected one or more control regions are used by a synthetic controls method.

7. The method of claim 5, wherein the first network baseline is determined based on the network performance data collected during the second time period after the network deployment.

8. The method of claim 1, wherein the second group of geographic regions are hold-out regions excluded from being impacted by the network deployment, wherein the selected one or more control regions are randomly selected from the second group of geographic regions, and wherein the first network metric baseline is determined based on the selected one or more controls regions.

9. The method of claim 1, further comprising:
   comparing a second network metric of the geographic region of interest after the network deployment to a second network metric baseline; and
   determining whether the second network metric of the geographic region of interest has a change greater than a second pre-determined threshold after the network deployment.

10. The method of claim 9, wherein the second network baseline is determined based on network performance data of the geographic of interest before the network deployment.

11. The method of claim 9, wherein the second network metric comprises one or more of:
    a churned user number;
    a user churning rate;
    a new user number; or
    a resurrected user number.

12. The method of claim 1, wherein the at least one metric feature comprises one or more of:
    a metric trend;
    a metric value;
    a metric range;
    a metric changing slope;
    a metric error level;
    a metric change; or
    a metric confidence level.

13. The method of claim 1, further comprising determining a cause-effect correlation between the change of the first network metric and the network deployment when the change of the first network metric is greater than the first pre-determined threshold.

14. The method of claim 1, wherein the one or more network metrics comprise one or more of:
    an incremental network metric;
    a monthly active people metric;
    a network speed metric;
    a network latency metric; or
    a time spent metric.

15. The method of claim 1, wherein the geographic region of interest is a kilometer-level small-scale region.

16. The method of claim 1, further comprising:
    determining a first distribution of a third network metric of the geographic region of interest over a set of network metric buckets before the network deployment;
    determining a second distribution of the third network metric of the geographic region of interest over the set of network metric buckets after the network deployment;
    comparing the first distribution and second distribution of the third network metric; and
    determining whether the third network metric has a change greater than a third pre-determined threshold after the network deployment.

17. The method of claim 16, wherein the third network metric is determined by a carrier-specific method, a carrier-agnostic method or a user-based method.

18. The method of claim 1, further comprising:
    aggregating the one or more network metrics across two or more carriers impacted by the network deployment; and determining whether the one or more network metrics have changes greater than respective pre-determined thresholds over the two or more carriers after the network deployment.

19. One or more computer-readable non-transitory storage media embodying software that is operable when executed to:

determine one or more network metrics for a plurality of geographic regions connected by a communication network, wherein the plurality of geographic regions comprise a geographic region of interest impacted by a network deployment;

identify a set of candidate control regions by clustering two or more geographic regions of the plurality of geographic regions into a first group of geographic regions based on at least one metric feature of at least one network metric shared by the two or more geographic regions, wherein each metric feature measures a change in the value of the corresponding network metric during a particular time period, wherein each metric feature measures a change in the value of the corresponding network metric during a particular time period;

select one or more control regions from the set of candidate control regions by identifying a second group of geographic regions from the first group of geographic regions based on a comparison between the region of interest and each of the first group of geographic regions;

compare a first network metric associated with the geographic region of interest to a first network metric baseline, wherein the first network metric baseline is determined based on the one or more control regions; and determine whether the first network metric associated with the geographic region of interest has a change greater than a first pre-determined threshold after the network deployment.

20. A system comprising: one or more non-transitory computer-readable storage media embodying instructions; and one or more processors coupled to the storage media and operable to execute the instructions to:

determine one or more network metrics for a plurality of geographic regions connected by a communication network, wherein the plurality of geographic regions comprise a geographic region of interest impacted by a network deployment;

identify a set of candidate control regions by clustering two or more geographic regions of the plurality of geographic regions into a first group of geographic regions based on at least one metric feature of at least one network metric shared by the two or more geographic regions, wherein each metric feature measures a change in the value of the corresponding network metric during a particular time period;

select one or more control regions from the set of candidate control regions by identifying a second group of geographic regions from the first group of geographic regions based on a comparison between the region of interest and each of the first group of geographic regions;

compare a first network metric associated with the geographic region of interest to a first network metric baseline, wherein the first network metric baseline is determined based on the one or more control regions; and determine whether the first network metric associated with the geographic region of interest has a change greater than a first pre-determined threshold after the network deployment.

* * * * *